US012694159B2

(12) United States Patent
Venkatraman et al.

(10) Patent No.: US 12,694,159 B2
(45) Date of Patent: Jul. 28, 2026

(54) DYNAMIC DIGITAL IMMUNE SYSTEM (DDIS) FOR EXPLAINABLE-AL INTEGRITY

(71) Applicant: Bank of America Corporation, Charlotte, NC (US)

(72) Inventors: Pratheesh Venkatraman, Concord, NC (US); Dnyanesh Ballikar, St. Johns, FL (US); Carlton Merritt, Huntersville, NC (US); Pushkar Taneja, Hyderabad (IN); Nikhil Ram, Huntersville, NC (US); Yash Dashputra, Manikonda (IN); Amar Deep Reddy, Hyderabad (IN); Rahul Saluja, Hyderabad (IN); Aniket Ashok Sawant, Thane (IN); Lisa J. Brown, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 33 days.

(21) Appl. No.: 18/929,767

(22) Filed: Oct. 29, 2024

(65) Prior Publication Data

US 2026/0119722 A1     Apr. 30, 2026

(51) Int. Cl.
*G06F 21/64* (2013.01)
*G06F 16/215* (2019.01)
(Continued)

(52) U.S. Cl.
CPC ............ *G06F 21/64* (2013.01); *G06F 16/215* (2019.01); *G06F 21/16* (2013.01); *G06F 21/602* (2013.01); *G06Q 30/018* (2013.01)

(58) Field of Classification Search
CPC ........ G06F 21/64; G06F 16/215; G06F 21/16; G06F 21/602; G06Q 30/018
See application file for complete search history.

(56) References Cited

U.S. PATENT DOCUMENTS 8,706,914 B2     4/2014   Duchesneau
8,706,915 B2     4/2014   Duchesneau
(Continued)

FOREIGN PATENT DOCUMENTS

CN       117609205 A  *  2/2024   .......... G06F 16/215
DE   202025101708 U1 *  5/2025   .......... G06F 16/214

OTHER PUBLICATIONS

Satyanarayanan A. Optimizing Data Quality in Real-Time: A Self-Healing Pipeline Approach. IJAIBDCMS [Internet]. Jun. 30, 2022. 3(2):62-80. Available from: https://ijaibdcms.org/index.php/ijaibdcms/article/view/219 (Year: 2022).*

(Continued)

*Primary Examiner* — Michael R Vaughan
(74) *Attorney, Agent, or Firm* — Banner & Witcoff, Ltd.

(57)        ABSTRACT

Dynamic Digital Immune Systems/Processes (DDIS) improve data integrity and quality in Explainable AI (XAI) systems. Operating in real time, it monitors data from distributed sources during federated training, detecting and flagging corrupted, poisoned, or low-quality data with dynamic anomaly detection algorithms. The system includes automated data cleaning to remove redundant and irrelevant data, enhancing AI model performance. It features dynamic encryption that adapts to data sensitivity, ensuring robust security. Swarm intelligence-based task distribution allows decentralized auditing of data integrity, while a traceability matrix tracks data lineage for transparency. The DDIS also incorporates a self-healing mechanism that automatically corrects identified anomalies, ensuring continuous reliability of AI outputs. This comprehensive system protects against data corruption, enhances processing efficiency, and safeguards the accuracy and integrity of XAI systems in high-stakes environments.

20 Claims, 9 Drawing Sheets

(51) Int. Cl.

| | | |
|---|---|---|
| *G06F 21/16* | (2013.01) | |
| *G06F 21/60* | (2013.01) | |
| *G06Q 30/018* | (2023.01) | |

(56) References Cited

U.S. PATENT DOCUMENTS

| | | | |
|---|---|---|---|
| 9,143,392 B2 | | 9/2015 | Duchesneau |
| 9,600,504 B2 | * | 3/2017 | Marrelli ............ G06F 16/24578 |
| 10,454,498 B1 | | 10/2019 | Mao |
| 10,776,740 B2 | * | 9/2020 | Halberstadt ........... G06F 16/254 |
| 11,023,179 B2 | | 6/2021 | Karumbunathan et al. |
| 11,277,390 B2 | | 3/2022 | Verzun et al. |
| 11,340,837 B1 | | 5/2022 | Vohra et al. |
| 11,379,254 B1 | | 7/2022 | Karumbunathan et al. |
| 11,768,635 B2 | | 9/2023 | Vohra et al. |
| 11,831,624 B2 | | 11/2023 | Verzun et al. |
| 11,907,804 B2 | | 2/2024 | Rahman |
| 11,928,366 B2 | | 3/2024 | Karumbunathan et al. |
| 11,990,943 B2 | | 5/2024 | Rahman |
| 2005/0131855 A1 | * | 6/2005 | Forman ............... G06F 16/2272 |
| 2009/0216910 A1 | | 8/2009 | Duchesneau |
| 2013/0306276 A1 | | 11/2013 | Duchesneau |
| 2014/0317315 A1 | | 10/2014 | Duchesneau |
| 2015/0310055 A1 | * | 10/2015 | Derstadt ............ G06F 16/2365 |
| | | | 707/687 |
| 2016/0248631 A1 | | 8/2016 | Duchesneau |
| 2019/0386969 A1 | | 12/2019 | Verzun et al. |

| | | | |
|---|---|---|---|
| 2020/0159421 A1 | | 5/2020 | Karumbunathan et al. |
| 2020/0349169 A1 | * | 11/2020 | Venkatesan .............. G06N 5/01 |
| 2020/0382219 A1 | | 12/2020 | Innes et al. |
| 2021/0019612 A1 | * | 1/2021 | Carrasco ................. G06N 3/08 |
| 2021/0126826 A1 | * | 4/2021 | Nolan ................... H04W 12/76 |
| 2022/0215279 A1 | | 7/2022 | Rahman |
| 2022/0216924 A1 | | 7/2022 | Rahman |
| 2022/0253255 A1 | | 8/2022 | Vohra et al. |
| 2022/0350493 A1 | | 11/2022 | Karumbunathan et al. |
| 2022/0368682 A1 | | 11/2022 | Verzun et al. |
| 2023/0275759 A1 | | 8/2023 | Majumdar |
| 2024/0012583 A1 | | 1/2024 | Vohra et al. |
| 2024/0054369 A1 | * | 2/2024 | Podrazka .............. G06N 5/045 |
| 2024/0098072 A1 | | 3/2024 | Verzun et al. |
| 2024/0119550 A1 | | 4/2024 | Stockert et al. |
| 2024/0211180 A1 | | 6/2024 | Karumbunathan et al. |
| 2024/0264986 A1 | * | 8/2024 | Liu ...................... G06F 16/215 |
| 2024/0281419 A1 | * | 8/2024 | Alfaras ................ G06F 16/215 |
| 2025/0077492 A1 | * | 3/2025 | Liu .................... G06F 16/2358 |
| 2025/0390768 A1 | * | 12/2025 | Turrell ................... G06N 5/022 |

OTHER PUBLICATIONS

Anand S, Sharma S. Self-Healing Data Pipelines for Handling Anomalies in Medicaid and CHIP Data Processing. IJAIBDCMS [Internet]. Jun. 29, 2024. 5(2):27-3. Available from: https://ijaibdcms.org/index.php/ijaibdcms/article/view/87 (Year: 2024).*

\* cited by examiner

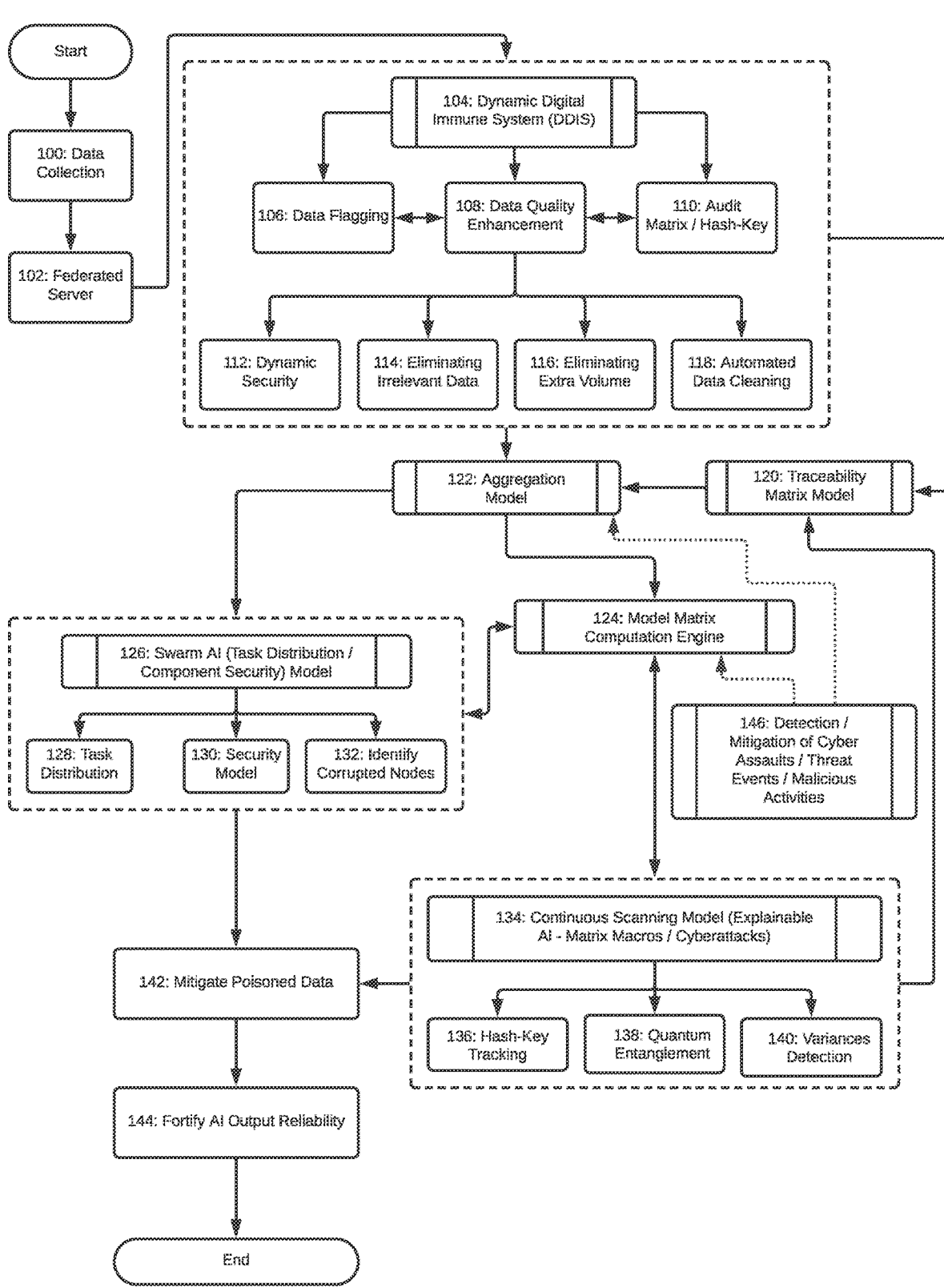
FIG. 1: Logic Diagram

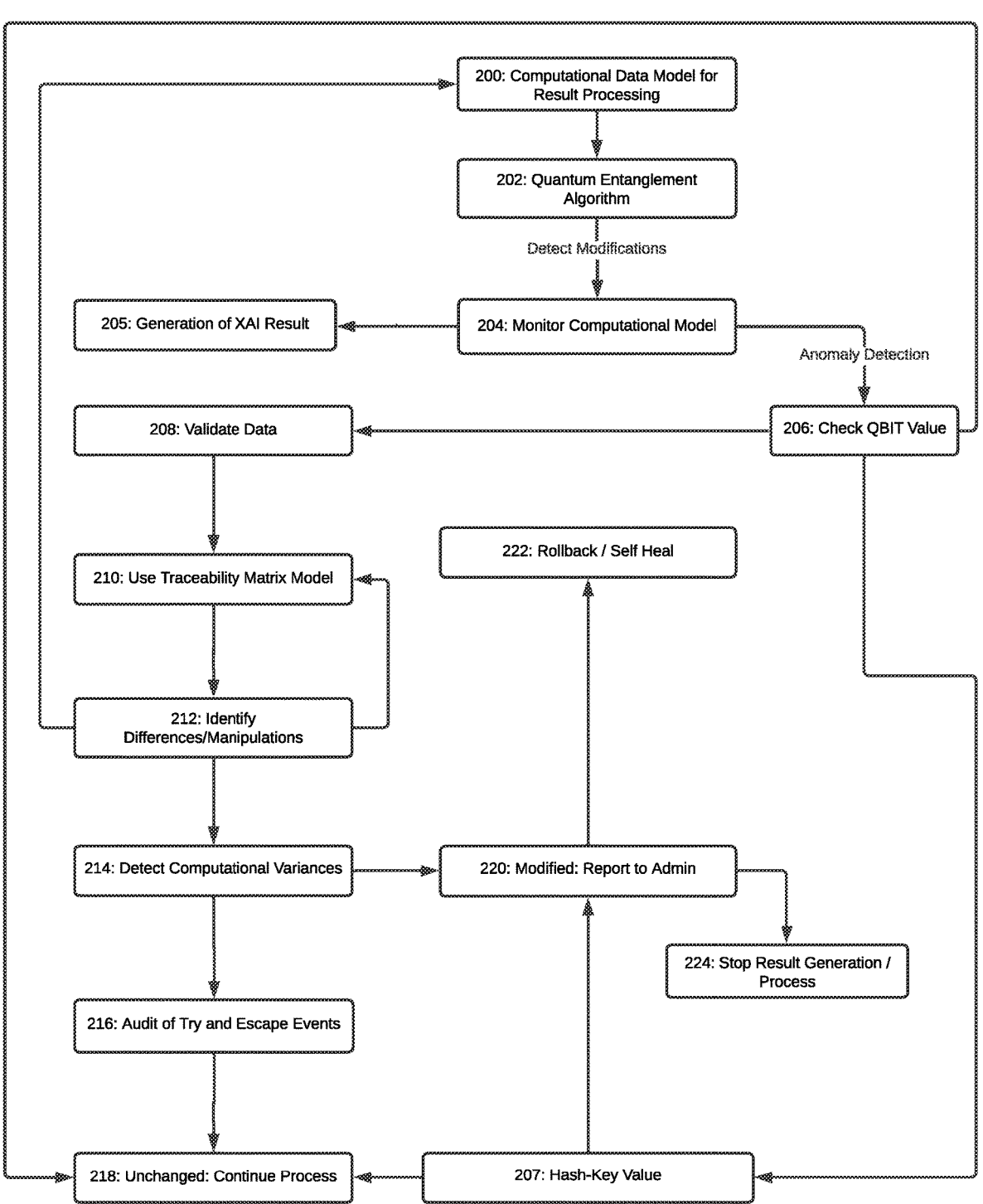
FIG. 2: Flow Diagram

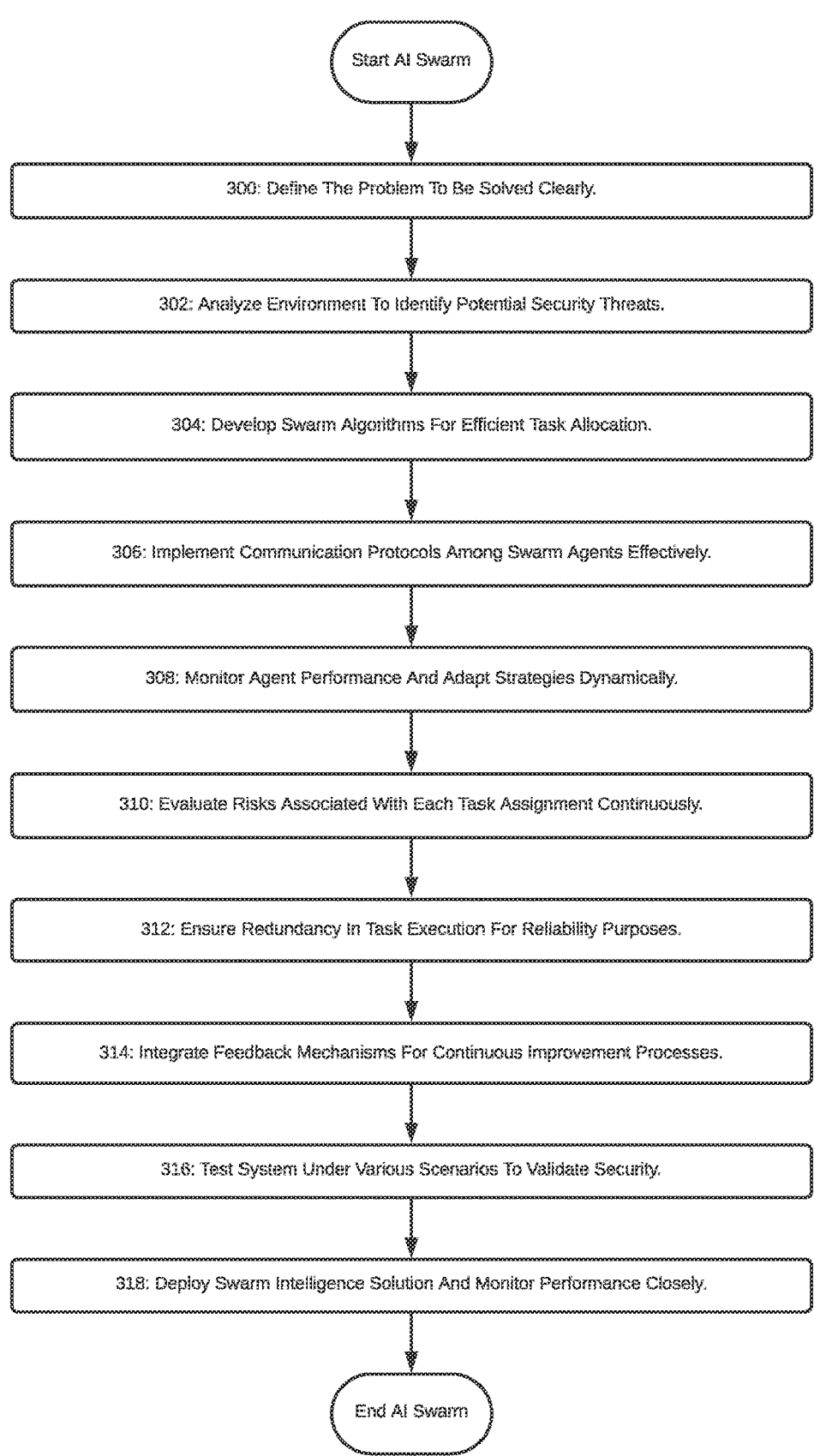
FIG. 3: AI - Swarm Intelligence Task Distribution / Security Process

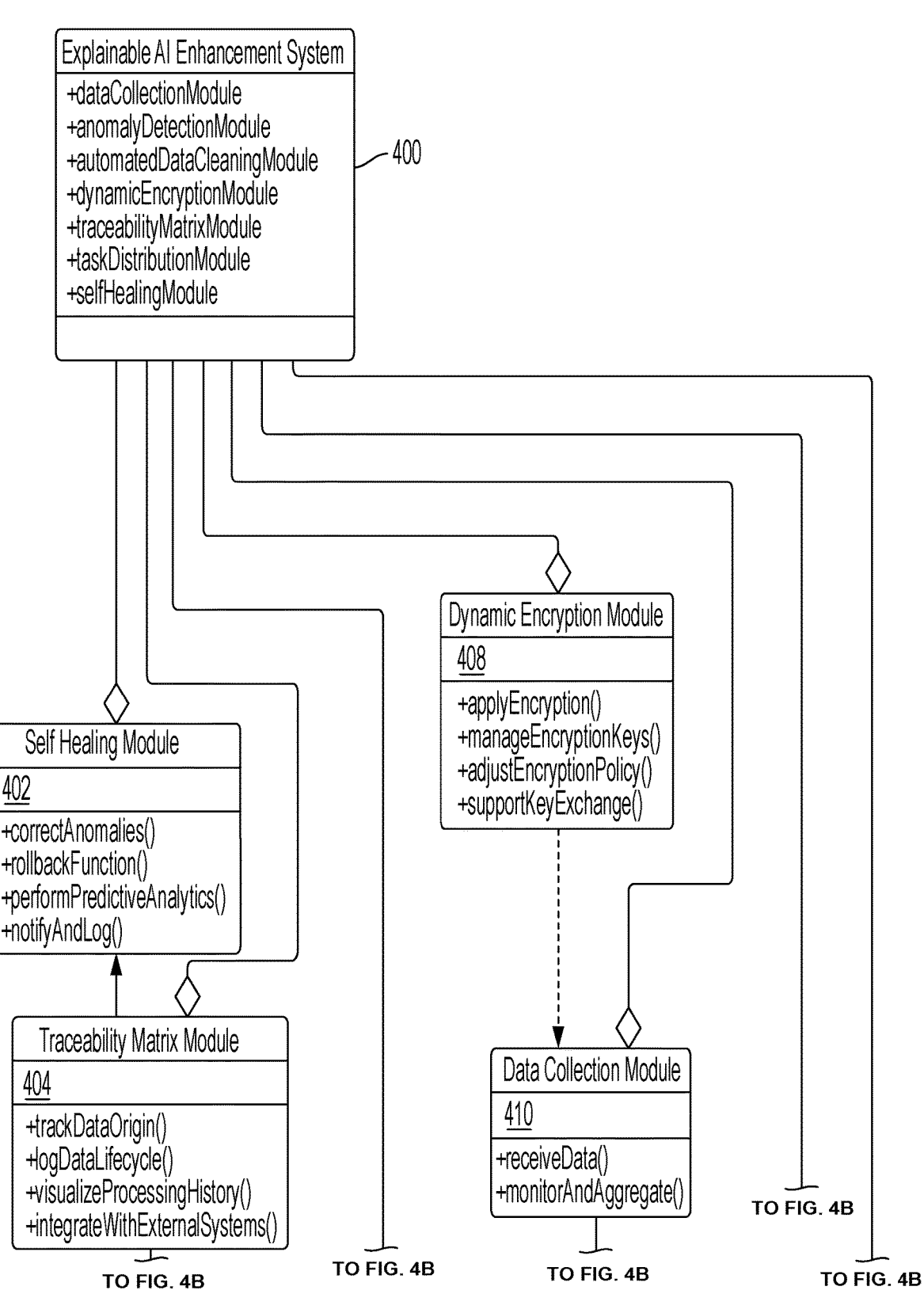
FIG. 4A: System Diagram

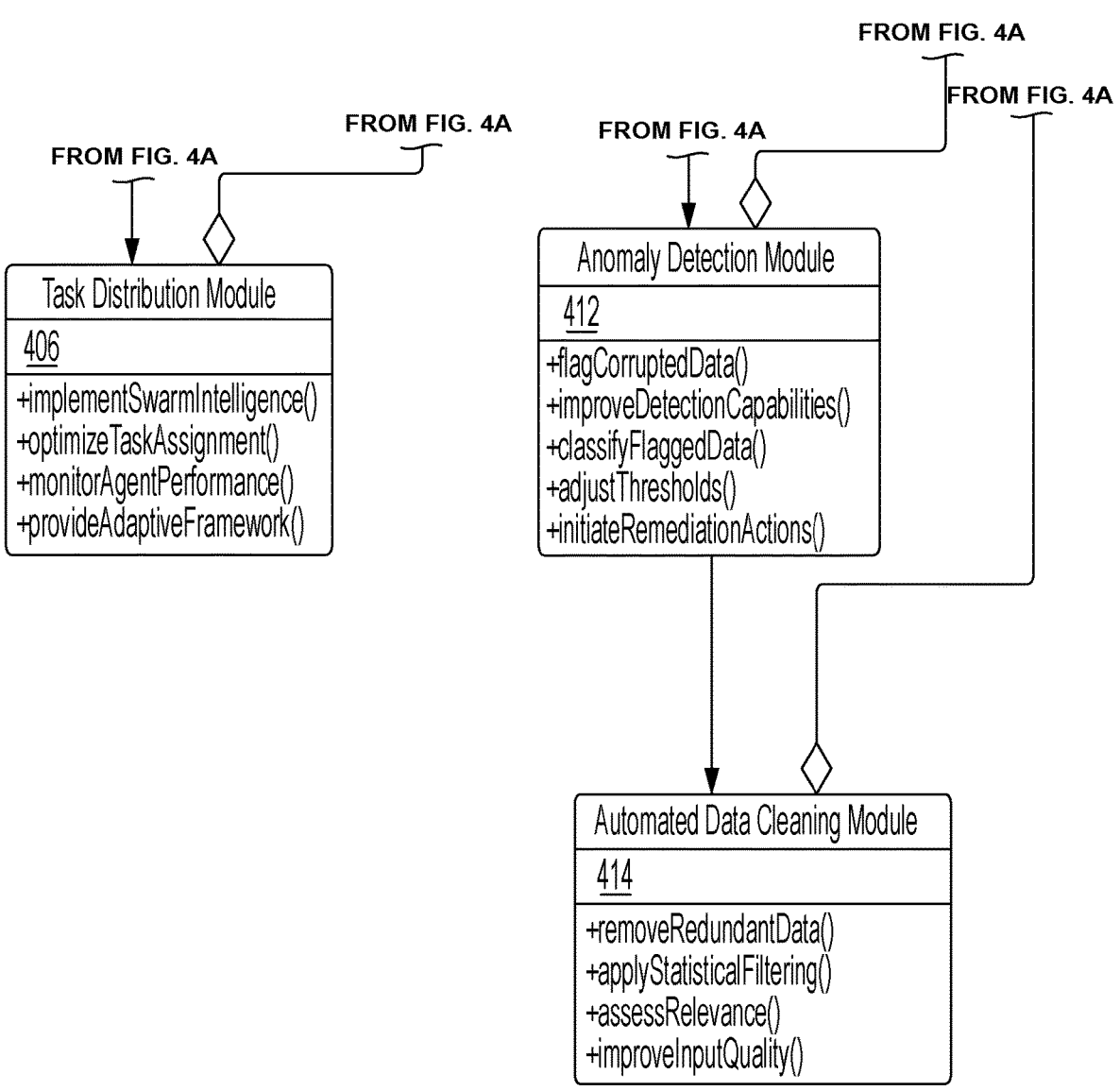
FIG. 4B: System Diagram

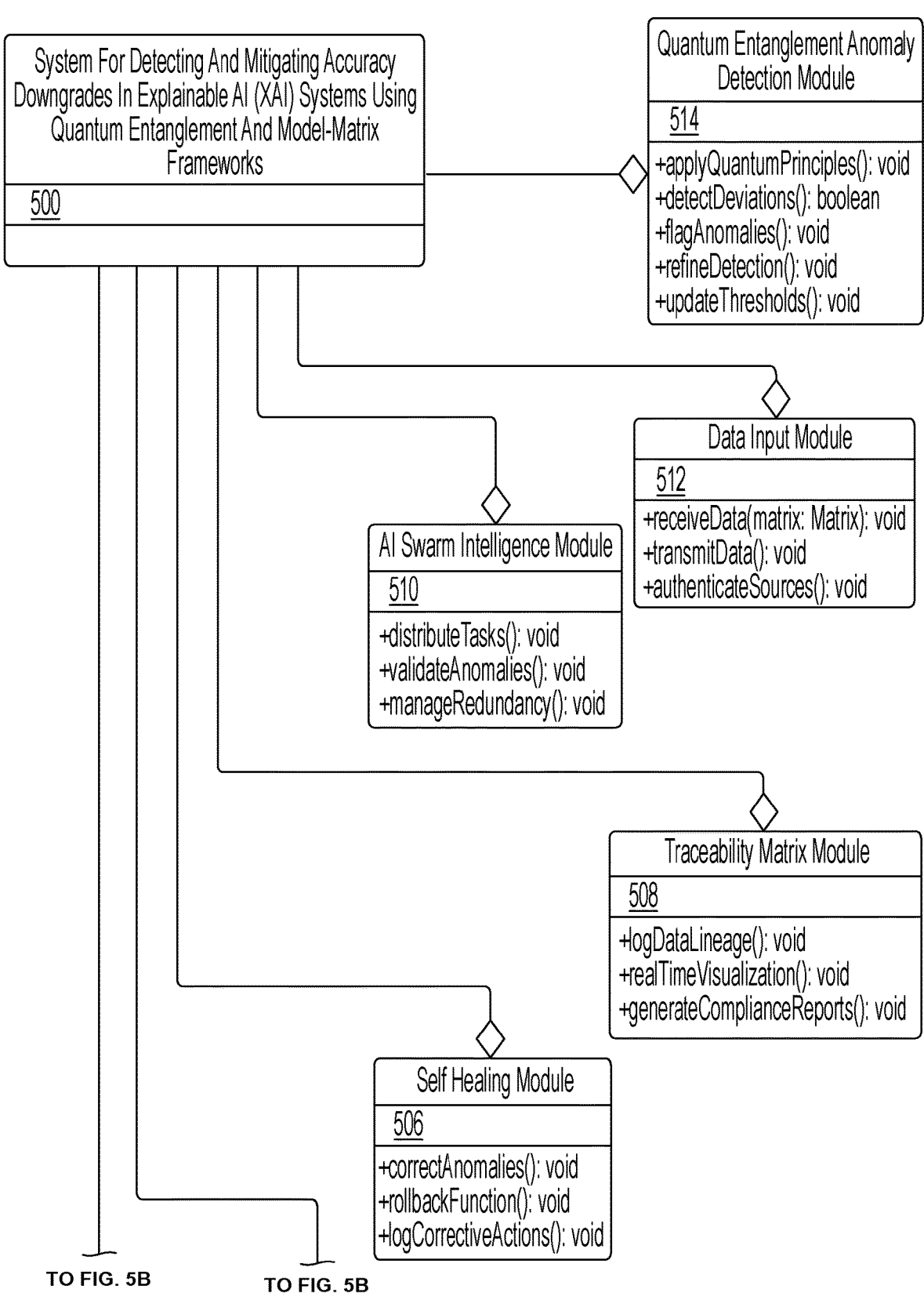
TO FIG. 5B          TO FIG. 5B
FIG. 5A: System Diagram

FROM FIG. 5A                    FROM FIG. 5A
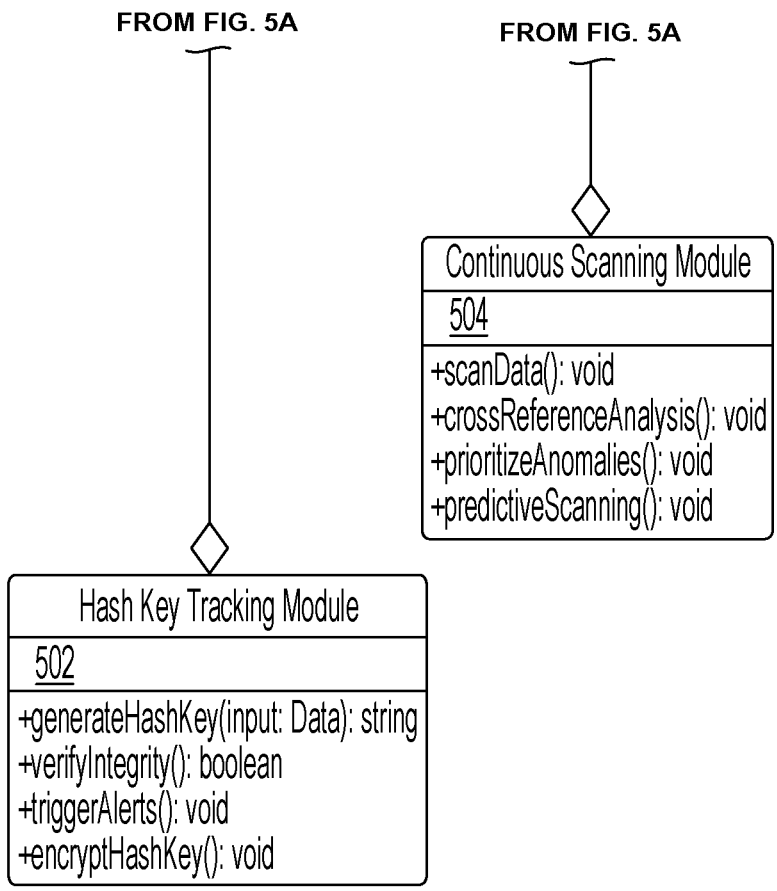
Continuous Scanning Module
504
+scanData(): void
+crossReferenceAnalysis(): void
+prioritizeAnomalies(): void
+predictiveScanning(): void
Hash Key Tracking Module
502
+generateHashKey(input: Data): string
+verifyIntegrity(): boolean
+triggerAlerts(): void
+encryptHashKey(): void
FIG. 5B: System Diagram

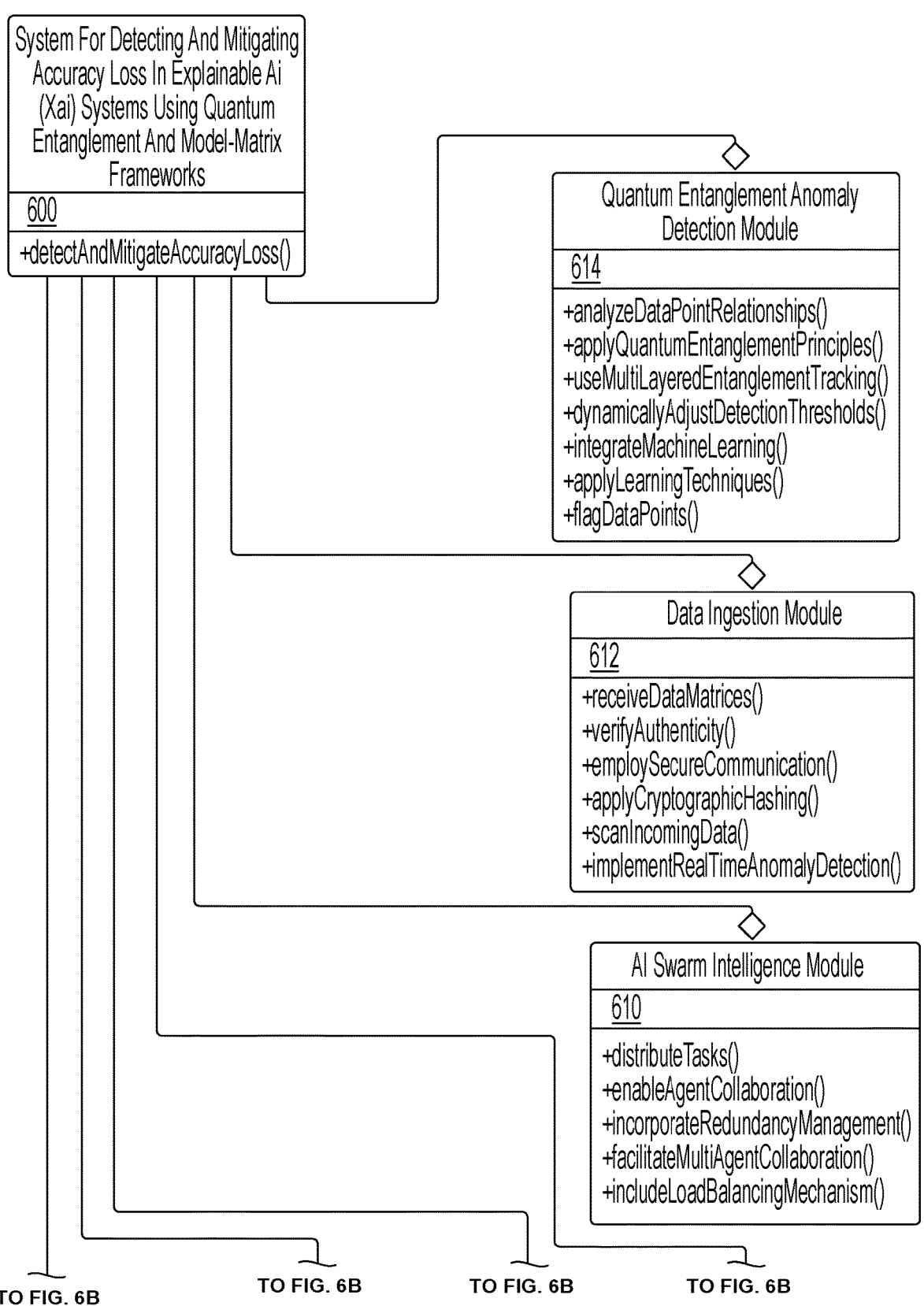
FIG. 6A: System Diagram

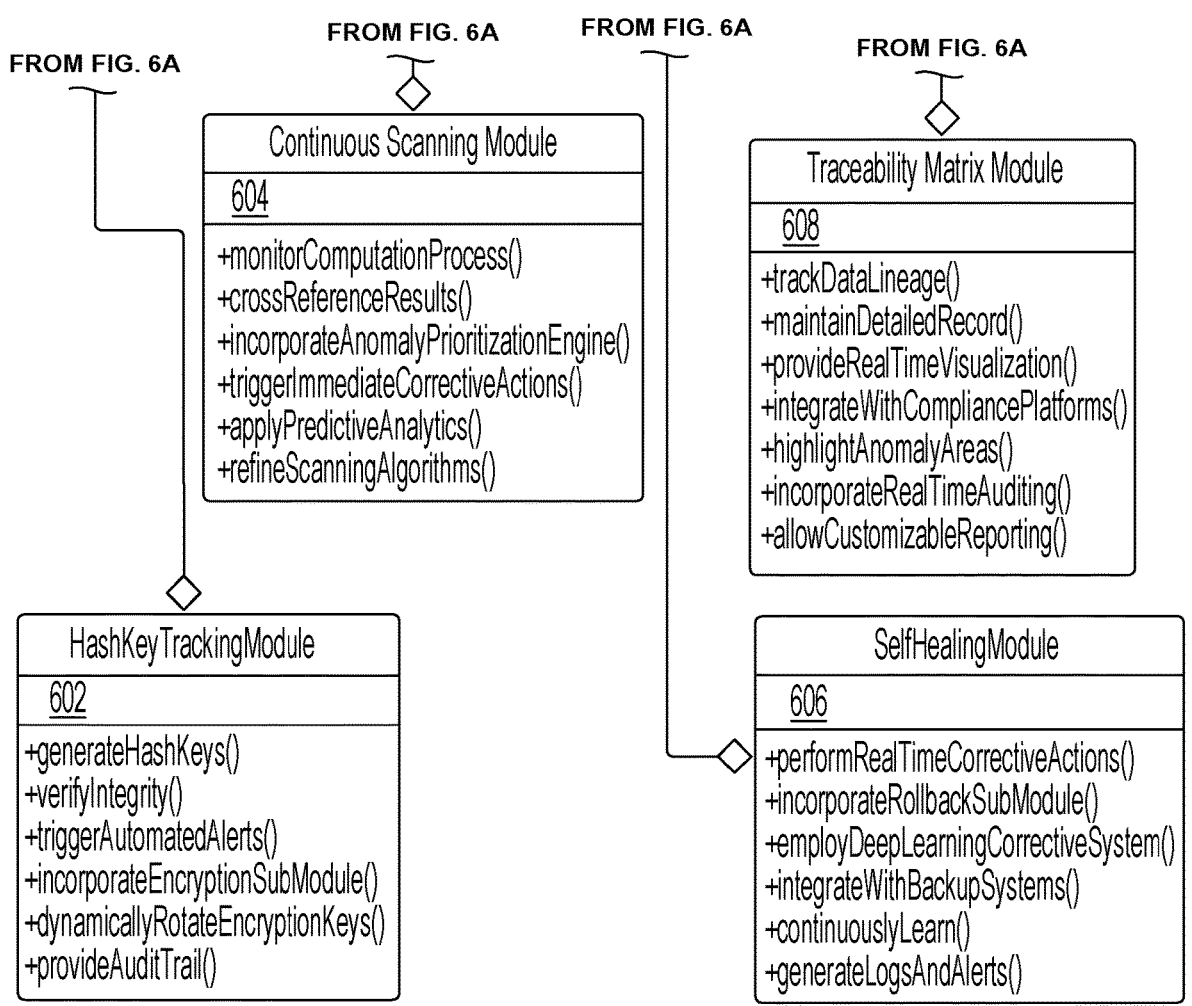

FROM FIG. 6A    FROM FIG. 6A    FROM FIG. 6A

FROM FIG. 6A

Continuous Scanning Module

<u>604</u>

+monitorComputationProcess()
+crossReferenceResults()
+incorporateAnomalyPrioritizationEngine()
+triggerImmediateCorrectiveActions()
+applyPredictiveAnalytics()
+refineScanningAlgorithms()

Traceability Matrix Module

<u>608</u>

+trackDataLineage()
+maintainDetailedRecord()
+provideRealTimeVisualization()
+integrateWithCompliancePlatforms()
+highlightAnomalyAreas()
+incorporateRealTimeAuditing()
+allowCustomizableReporting()

HashKeyTrackingModule

<u>602</u>

+generateHashKeys()
+verifyIntegrity()
+triggerAutomatedAlerts()
+incorporateEncryptionSubModule()
+dynamicallyRotateEncryptionKeys()
+provideAuditTrail()

SelfHealingModule

<u>606</u>

+performRealTimeCorrectiveActions()
+incorporateRollbackSubModule()
+employDeepLearningCorrectiveSystem()
+integrateWithBackupSystems()
+continuouslyLearn()
+generateLogsAndAlerts()

FIG. 6B: System Diagram

DYNAMIC DIGITAL IMMUNE SYSTEM (DDIS) FOR EXPLAINABLE-AL INTEGRITY

TECHNICAL FIELD

The inventions (individually and/or collectively "invention") disclosed herein pertain to the field of artificial intelligence and machine learning, particularly Explainable AI (XAI) systems. This technical field involves the creation, training, and implementation of AI models that provide transparent and interpretable outputs. Specifically, the inventions improve the reliability, transparency, and security of AI systems by addressing challenges such as poisoned data, cyberattacks, and accuracy degradation. The disclosed systems apply advanced techniques, such as swarm intelligence, anomaly detection, and quantum entanglement, to ensure that AI systems generate accurate, traceable, and secure results. The inventions relate to the enhancement of machine learning models through data quality checks, continuous monitoring, and validation to support critical decision-making processes in sectors such as finance and autonomous systems.

DESCRIPTION OF THE RELATED ART

In the realm of artificial intelligence, particularly within Explainable AI (XAI) systems, maintaining the integrity of model performance has become an increasingly complex challenge due to the growing sophistication of cyberattacks and data manipulation techniques. As AI is widely implemented across sectors such as finance, autonomous systems, and cybersecurity, the reliability of AI-generated outputs directly influences decision-making processes that impact organizations, individuals, and systems. One of the most pressing issues these systems face is the degradation of data integrity due to poisoned data and cyberattacks. Poisoned data refers to corrupted, low-quality, or intentionally altered inputs that distort the AI's predictions, while cyberattacks represent deliberate attempts by malicious actors to manipulate data or processes in order to influence AI outputs. These threats significantly undermine the core purpose of XAI, which is to provide transparent and reliable explanations for decisions made by AI systems.

The degradation of AI performance due to poisoned data and cyberattacks leads to inaccurate predictions, which can have severe consequences in various industries. For instance, in the financial sector, credit assessments or risk models based on manipulated or poisoned data may result in faulty loan approvals or rejections, skewed investment decisions, or improper valuations. Similarly, in the field of autonomous systems, such as self-driving vehicles, manipulated data can lead to dangerous operational decisions, as the system misinterprets its inputs. Thus, ensuring the accuracy and integrity of the data processed by AI models is critical to preventing such errors and maintaining the reliability of AI-driven decision-making processes.

Additionally, Explainable AI systems are particularly vulnerable because their purpose is to make the decision-making process clear and understandable. This transparency can be targeted by attackers who gain knowledge of how inputs are processed and how explanations are generated. These attackers can then strategically inject poisoned data or manipulate computational processes to introduce subtle changes that lead to incorrect system outputs. When the explanation provided by the system is itself compromised, trust in the AI's decisions is further eroded, creating a cascading problem that affects the broader use of AI across industries.

The risks associated with compromised AI systems go beyond technical failures; they represent significant business, regulatory, and ethical issues. Companies that rely on AI-generated insights face financial losses and reputational damage if the AI models they use fail to perform as expected. For example, inaccurate risk assessments in financial institutions or manipulated decision models in autonomous systems can lead to severe economic consequences. These risks hinder the adoption of AI in sectors where transparency and trust are paramount. Organizations need robust systems to ensure that their AI tools produce reliable, transparent, and accurate results, even in the face of cyber threats and data corruption.

Another critical challenge stems from the large scale at which modern AI systems operate. AI models are increasingly built on massive datasets, often collected from numerous distributed sources. In such environments, ensuring data consistency and integrity becomes increasingly difficult. The risks posed by poisoned or manipulated data are amplified by the volume and complexity of the data being processed. With millions of data points flowing into AI models from diverse sources, detecting and correcting errors becomes an arduous task. Traditional data validation techniques are often inadequate to handle such complexity, and sophisticated attacks can easily evade detection, leading to compromised outputs.

Federated learning environments, in which data is gathered from decentralized systems and processed collaboratively, introduce additional layers of complexity in maintaining data integrity. In such environments, data from a single compromised source can infiltrate and degrade the entire system's accuracy. The decentralized nature of federated learning complicates the task of detecting anomalies and correcting data, as data discrepancies may be hidden within specific segments or silos, making them difficult to detect until they have propagated through the system.

Conventional cybersecurity approaches are not well-suited to address these particular challenges. While traditional security measures often focus on preventing unauthorized access or mitigating external threats, they do not adequately address the internal threat posed by data integrity issues within AI models. Even when an AI system is protected from external intrusions, internal corruption of data or computational processes can still lead to significant errors. Thus, a deeper level of security is required—one that not only protects the system from unauthorized access but also ensures that the data being processed is valid, trustworthy, and uncorrupted.

The complexity of AI computations adds further difficulty in addressing this problem. XAI models use complex algorithms to process vast amounts of data and generate explanations for their decisions. Small manipulations in the input data can cause significant errors in the resulting output, making it difficult to detect when a system has been compromised. Detecting these subtle yet impactful changes require advanced error detection and correction techniques that go beyond conventional methods. Without such techniques, AI systems will continue to produce erroneous results, which may not be immediately recognizable but will still negatively impact decision-making processes over time.

Moreover, AI models are often referred to as "black boxes" due to their opaque and intricate nature, which makes it difficult to trace errors back to their source. Even though XAI aims to make these processes more transparent, pinpointing the exact origin of a corruption or manipulation within a complex computation remains a significant challenge. Conventional auditing and validation tools are not equipped to handle the nuances of detecting data poisoning or manipulation within AI model computations. As a result, the problem of detecting and correcting anomalies within AI model-matrix frameworks remains unsolved in many applications.

Challenges related to data quality are also particularly significant in AI environments that rely on vast amounts of data for training and decision-making. Poor-quality data, whether due to inconsistencies, missing information, or errors during data collection, can lead to substantial inaccuracies in the output generated by AI models. When data is not thoroughly validated before being fed into AI systems, the resulting models may produce flawed insights, decisions, or recommendations. Inadequate data validation and cleansing mechanisms exacerbate the problem, leading to a ripple effect where initial small errors compound as data moves through multiple layers of AI processing, further degrading model accuracy.

Challenges related to matrix data and the increasing frequency of cyberattacks further complicate these issues. AI systems often rely on matrix data for computations, where each entry in a matrix corresponds to a specific relationship or computation. These matrices are vulnerable to manipulation at multiple levels-attackers can alter individual entries or entire sections of the matrix without changing the final output. This leads to a situation where the AI model continues to operate on seemingly legitimate data, but the underlying computations are corrupted. In the context of cyberattacks, these manipulations can be highly targeted, making it difficult to detect anomalies before the system has already been compromised.

Additionally, model-matrix macros used in AI computations create a further avenue for target by attackers. These macros are essential for AI computations, enabling the processing of complex data patterns and relationships. However, they can be subtly manipulated by attackers in ways that evade detection. An attacker could alter these macros without changing the overall structure of the data, resulting in outputs that seem legitimate but are based on corrupted processes. This type of attack is particularly dangerous because it bypasses traditional security measures and directly impacts the decision-making process without leaving clear evidence of tampering.

The consequences of compromised AI systems are vast, as AI continues to play an integral role in critical infrastructure such as financial systems, supply chain management, and autonomous technologies. A failure in AI decision-making in these domains can lead to widespread disruptions and economic losses. For example, inaccurate risk models in financial markets, manipulated decision-making in autonomous systems, or compromised security systems in critical infrastructure could result in costly and far-reaching consequences. As AI continues to be integrated into these vital systems, the risks posed by poisoned data and manipulated computations will only grow, making it imperative to address these challenges head-on.

In addition to the risks associated with poisoned data, another significant security challenge arises from the problem of "try and escape" in the context of hash-key verification. Hash keys are typically used to verify data integrity by generating a unique digital fingerprint of the final result of a computation. However, this approach is flawed when the hash is generated only on the final output, without accounting for the method or formula used to achieve that result. Attackers can manipulate the underlying formulas or computational steps while still producing the same final output, leaving the hash key unchanged. As a result, the system may incorrectly verify the integrity of the data, even though it has been compromised.

This vulnerability is targeted in the "try and escape" technique, where attackers modify the system and test whether their manipulation is detected by the hash-key verification mechanism. If the hash key remains valid, they know their changes have bypassed the integrity check. They can either leave the manipulated data in place or revert the changes if detection occurs, allowing them to escape without triggering an alert. This probing process enables attackers to refine their approach, gradually learning how to target the system's weaknesses and introduce increasingly effective manipulations over time.

In the context of poisoned data matrices, the "try and escape" problem compounds the security risks. AI models often rely on complex matrices for data processing, with numerous computations and formulas involved in generating predictions. By altering the formulas without changing the final outputs, attackers can introduce subtle changes that affect the system's decision-making without detection. The hash key generated solely on the final result would remain valid, allowing the attacker to escape detection and leaving the system vulnerable to further manipulation.

This problem is exacerbated by the fact that poisoned data matrices can affect large portions of the AI model's processing. If an attacker successfully manipulates one part of the matrix without detection, the impact can ripple through the entire system, corrupting the outputs in ways that are difficult to trace. The system may continue to function as though everything is normal, while producing outputs based on compromised computations. Over time, the integrity of the entire AI model can be undermined, leading to long-term failures in decision-making.

The "try and escape" technique also allows attackers to refine their strategies over time. By gradually introducing changes and observing how the system responds, attackers can target weaknesses in the hash-key verification process. They may start by making small, inconspicuous changes, and as they learn more about the system's vulnerabilities, they can escalate their attacks, causing more significant disruptions without immediate detection. This iterative process makes it increasingly difficult to safeguard AI systems from long-term manipulation.

The long-felt need for a solution to these issues has persisted as AI systems become more prevalent and integrated into critical infrastructure. Despite efforts to secure AI models, existing approaches have failed to fully address the risks posed by poisoned data matrices and the manipulation of computation processes. Traditional hash-key verification methods are not sufficient to detect the nuanced ways in which attackers can alter AI models without changing the final output. The ability to manipulate computation methods while escaping detection through the "try and escape" technique represents a significant gap in current AI security frameworks, and there has been no comprehensive solution capable of addressing this vulnerability across the entire data lifecycle.

The unmet need for a more sophisticated approach to securing AI models is clear, particularly as AI continues to play an increasingly important role in decision-making processes across various industries. There is a growing demand for advanced methods that can detect and mitigate accuracy loss in XAI systems in real time, while providing robust protection against both internal and external threats.

This need is especially critical as AI becomes a foundational technology for critical decision-making across sectors, and the integrity of AI outputs becomes a matter of economic, operational, and organizational stability.

SUMMARY OF THE INVENTION

In a first aspect, a Dynamic Digital Immune System (DDIS) is designed to enhance the quality and integrity of data used in Explainable AI (XAI) systems. The systems and processes involved therein operate by continuously monitoring the data that is collected from multiple distributed sources, ensuring that only high-quality, valid, and relevant data is used for AI model processing. At the center of the invention is the notion that data integrity plays a critical role in ensuring accurate AI outputs, and the DDIS serves as an intelligent layer that actively scans for anomalies and data inconsistencies that could compromise the AI system's predictions. The system is built to operate dynamically, adapting to various data inputs in real-time, and it integrates security features such as dynamic encryption to protect sensitive information.

One of the key features of the invention is its ability to identify and flag data anomalies as they occur during data collection. Using advanced anomaly detection algorithms, the DDIS automatically flags data that may be corrupted, irrelevant, or of poor quality. This is essential in preventing bad data from being processed by the AI model, as data anomalies can significantly degrade the performance of AI models. By identifying these issues early in the data pipeline, the system ensures that AI models receive only the most reliable data for decision-making. The flagged data is then subjected to further scrutiny through a robust audit mechanism, which verifies its quality and integrity before it is processed.

Another core feature of the DDIS is its ability to perform data quality enhancement. Once data anomalies are flagged, the system applies various techniques to improve the quality of the data. For instance, the system employs volume elimination to filter out unnecessary or redundant data, ensuring that only the most relevant data is included in the AI model's processing. This feature is critical because excessive or irrelevant data can introduce noise into the AI model, leading to less accurate predictions. By eliminating such data, the system streamlines the processing pipeline and enhances the overall efficiency of the AI model.

In addition to volume elimination, the DDIS also features dynamic encryption for data security. This encryption ensures that any sensitive data being processed is protected from unauthorized access or manipulation. The system automatically applies encryption protocols to sensitive data as it is collected, adding a layer of security that is crucial for maintaining the confidentiality and integrity of the data. The encryption is dynamic, meaning it adapts to the sensitivity of the data being processed, providing robust protection while optimizing performance.

The DDIS also includes automated data cleaning, which is another crucial component of the data quality enhancement process. Data cleaning is necessary to remove errors, inconsistencies, and noise from the data, ensuring that only clean, validated data is used in the AI model. The system's automated data cleaning process is designed to operate in real time, continuously improving the quality of the data as it flows through the pipeline. This feature is especially important in environments where large volumes of data are processed continuously, as manual data cleaning would be inefficient and prone to errors.

Once the data has been cleaned, the DDIS conducts a comprehensive audit of the flagged and processed data. This data audit mechanism ensures that the flagged data is fully vetted before it is used in the AI model. The audit process involves checking the data against predefined quality metrics to determine whether it meets the necessary standards for inclusion in the AI system. If the data fails to meet these standards, it is either corrected or discarded, depending on the severity of the anomaly. This auditing process plays a crucial role in maintaining the integrity of the AI model, as it ensures that only high-quality data is used for decision-making.

One of the key elements of the DDIS is its traceability matrix model, which is used to track the data lineage throughout the entire data processing pipeline. The traceability matrix allows the system to maintain a detailed record of the origin and processing history of each data point, providing transparency and accountability in the data pipeline. This is particularly important in AI systems that rely on federated learning processes, where data is collected from multiple decentralized sources. By tracking the lineage of each data point, the system can quickly identify the source of any anomalies and take corrective action to resolve the issue.

The DDIS is also capable of integrating with swarm intelligence to enhance its auditing processes. Swarm intelligence is used to distribute the auditing tasks across multiple agents, allowing the system to perform real-time, decentralized data integrity checks. This collaborative approach ensures that the system can scale effectively, even in environments with large volumes of data. Each agent in the swarm performs a specific auditing task, and their collective actions ensure that the data pipeline remains secure and reliable at all times. This use of swarm intelligence significantly improves the system's ability to detect and respond to anomalies in real time.

A significant aspect of the DDIS is its dynamic security model, which includes continuous scanning for potential threats and security breaches. The system is designed to detect cyber threats such as data tampering and unauthorized access attempts, which can compromise the integrity of the AI model. The continuous scanning model ensures that any suspicious activities are flagged and addressed immediately, preventing attackers from manipulating the data being processed. This security model is integrated with the system's encryption protocols and auditing mechanisms, providing a comprehensive approach to safeguarding the data pipeline.

The task distribution and component security model is another core feature of the DDIS. This model ensures that data auditing tasks are distributed efficiently among the system's resources, optimizing the auditing process and ensuring that corrupted or weak components within the system are identified and addressed. The task distribution model is particularly useful in large-scale AI systems, where multiple components are involved in the data processing pipeline. By distributing the tasks among different components, the system ensures that the workload is balanced, reducing the risk of bottlenecks or inefficiencies.

The DDIS also includes hash-key tracking as part of its security protocols. Hash-key tracking is used to ensure that the data being processed has not been tampered with. Each data point is assigned a unique hash key, which is verified throughout the data processing pipeline. If any manipulation or corruption occurs, the hash key will change, triggering an alert and allowing the system to take corrective action. This feature is essential for detecting cyberattacks that target the integrity of the data, as it provides a robust mechanism for ensuring that the data remains unchanged throughout the entire process.

Another important feature of the DDIS is its ability to identify poisoned data and prevent it from being processed by the AI model. Poisoned data refers to inputs that have been deliberately altered to produce incorrect or misleading AI outputs. The system's anomaly detection algorithms are specifically designed to detect poisoned data and flag it for further investigation. By preventing poisoned data from being processed, the system protects the AI model from generating inaccurate or harmful predictions, ensuring that the AI system remains reliable and trustworthy.

The DDIS is also capable of performing self-healing operations to correct any identified data anomalies. When the system detects an anomaly, it automatically initiates corrective actions to resolve the issue. This self-healing capability ensures that the data pipeline remains operational, even in the presence of anomalies or cyber threats. The system's ability to correct data anomalies in real time is a key feature that enhances the overall robustness and reliability of the AI model.

The core inventive features of the DDIS include its dynamic anomaly detection algorithms, data quality enhancement processes, automated data cleaning, swarm intelligence-based auditing, dynamic encryption, traceability matrix model, and self-healing capabilities. These features work together to provide a comprehensive solution for ensuring data integrity in XAI systems. The system's ability to detect, flag, and correct data anomalies in real time makes it an essential tool for organizations that rely on AI for critical decision-making processes.

Sample key functionality associated with this includes dynamic digital immune systems and processes, anomaly detection, data quality enhancement, automated data cleaning, traceability matrix, swarm intelligence, dynamic encryption, hash-key tracking, poisoned data detection, self-healing, etc. These reflect sample core functionalities of the systems and processes and highlight their role in improving the reliability and security of AI systems.

The DDIS provides a dynamic and adaptable approach to data integrity, ensuring that AI models operate on clean, valid, and secure data. Its integration of advanced security features and data quality enhancement processes sets it apart from traditional data validation systems, making it a crucial component for any organization looking to deploy AI systems in environments where data integrity is paramount. The invention addresses the need for a robust, scalable, and secure data processing pipeline that can adapt to the challenges posed by large-scale AI implementations.

In a second aspect, Quantum Entanglement Model-Matrix Analysis involves a system designed to detect and mitigate accuracy downgrades in Explainable AI (XAI) systems by leveraging quantum entanglement principles. This system focuses on the computation phase of AI processing, where data matrices are analyzed to generate predictions and decisions. By incorporating quantum entanglement techniques, the system enhances the AI model's ability to detect anomalies, both subtle and significant, that arise from poisoned data or cyberattacks. It provides a robust mechanism for identifying false positives and negatives that can distort AI outputs, ensuring that the AI system remains reliable and accurate.

A key feature of the invention is its ability to apply quantum entanglement principles to the computation of model-matrix macros. Quantum entanglement refers to the phenomenon where the states of two or more particles become interconnected, such that the state of one particle can instantaneously affect the state of another, regardless of the distance between them. This principle is used in the system to detect correlations or anomalies within the model-matrix computations. When the computation of a data matrix deviates from the expected pattern, the system detects this deviation as an anomaly, flagging it for further analysis. This enables the system to identify poisoned data or manipulated computations that would otherwise go undetected.

The system also includes hash-key tracking, a critical security feature that ensures the integrity of the data being processed. During the computation process, each segment of data is assigned a hash key, which is used to verify that the data has not been altered or tampered with. Unlike traditional hash-key mechanisms that focus solely on the final result, this system generates hash keys based on both the final result and the method or formula used to achieve that result. This ensures that any changes to the computational process, such as manipulation of formulas or macros, are detected immediately. If the hash key changes, the system flags the data as compromised, allowing it to take corrective actions before the data is used in decision-making.

The quantum entanglement-driven anomaly detection in this invention is particularly effective in identifying both false positives and false negatives. False positives occur when the system incorrectly flags valid data as anomalous, while false negatives occur when the system fails to detect compromised data. By leveraging quantum entanglement techniques, the system is able to detect subtle patterns and correlations within the model-matrix computations that might otherwise go unnoticed. This ensures that anomalies are detected accurately, reducing the occurrence of both false positives and negatives, and improving the overall reliability of the AI system.

A major aspect of this invention is the ability to detect poisoned data within the model-matrix computations. Poisoned data can distort the AI model's predictions and explanations, leading to incorrect or harmful outcomes. The quantum entanglement system is specifically designed to detect instances where poisoned data has infiltrated the computation process. By analyzing the entangled relationships between different data points, the system can identify patterns that deviate from the norm, signaling the presence of poisoned data. Once identified, the system can either correct the poisoned data or prevent it from being used in the AI model's outputs.

The system also incorporates a traceability matrix model to track the origin and lineage of the data being processed. This model ensures that each data point can be traced back to its original source, providing transparency and accountability throughout the data pipeline. This is especially important in environments where data is collected from multiple distributed sources, as it allows the system to quickly identify the source of any anomalies or data corruption. The traceability matrix also plays a key role in verifying the integrity of the data before it is used in the AI model's computations.

The quantum entanglement model-matrix computation engine is at the core of the invention. This engine processes the data matrices using quantum entanglement principles, ensuring that any deviations or anomalies are detected early in the computation process. The engine continuously monitors the relationships between different data points within the matrix, flagging any inconsistencies that could indicate data manipulation or corruption. This allows the system to maintain a high level of accuracy and reliability in its computations, even in the presence of external threats or poisoned data.

In addition to detecting anomalies, the system is capable of performing real-time corrective actions to mitigate the effects of data manipulation. When an anomaly is detected, the system can initiate a range of corrective measures, such as recalculating the affected data, generating alerts for system administrators, or automatically reverting to a previous state before the manipulation occurred. This self-healing capability ensures that the AI model can continue to operate reliably, even when faced with sophisticated attacks or data corruption.

Another important feature of the system is its ability to handle complex data matrices that are used in AI model computations. AI models often rely on large, multi-dimensional data matrices to make predictions and decisions. These matrices contain vast amounts of data and numerous computational formulas. The quantum entanglement system is designed to handle this complexity, ensuring that even the most intricate computations are monitored for anomalies. This makes the system highly effective in environments where large volumes of data are processed, such as financial systems, autonomous technologies, and critical infrastructure.

The swarm intelligence feature integrated into the system enhances its auditing and security capabilities. Swarm intelligence involves the use of multiple decentralized agents to collaborate on a task, mimicking the behavior of natural swarms such as ants or bees. In this invention, swarm intelligence is used to distribute the auditing tasks across multiple agents, allowing the system to perform real-time, decentralized data integrity checks. This approach ensures that the system can scale effectively and maintain high levels of security, even in environments with large amounts of data being processed simultaneously.

The task distribution and component security model ensures that auditing tasks are allocated efficiently across the system's resources. By distributing the workload among different components, the system optimizes the auditing process, reducing the risk of bottlenecks or inefficiencies. This feature is particularly important in large-scale AI systems where multiple components are involved in the data processing pipeline. The task distribution model also helps to identify and address any weak or compromised components within the system, ensuring that the overall integrity of the data pipeline is maintained.

The system's continuous scanning model is designed to detect potential security breaches or anomalies in real time. This model continuously monitors the computation process, scanning for any signs of data manipulation or unauthorized access attempts. The continuous scanning feature is integrated with the hash-key tracking and quantum entanglement anomaly detection systems, providing a comprehensive approach to security. By scanning the system continuously, the invention ensures that any threats are identified and mitigated as soon as they arise, preventing long-term damage to the AI model's integrity.

The core inventive features of this invention include quantum entanglement-driven anomaly detection, hash-key tracking, traceability matrix model, swarm intelligence-based auditing, real-time corrective actions, self-healing capabilities, and continuous scanning for security threats. These features work together to provide a comprehensive solution for ensuring the accuracy and integrity of AI model computations. The system's ability to detect and mitigate accuracy downgrades caused by data manipulation makes it an essential tool for maintaining reliable AI outputs.

Sample key functionality associated with the foregoing include quantum entanglement, model-matrix analysis, anomaly detection, hash-key tracking, traceability matrix, swarm intelligence, self-healing, poisoned data detection, continuous scanning, etc. These reflect sample core functionalities of the systems and processes and highlight their role in improving the security and reliability of AI systems.

The invention provides a cutting-edge approach to detecting and mitigating accuracy downgrades in AI systems. Its integration of quantum entanglement principles with advanced security features ensures that AI models can operate reliably, even in the presence of cyberattacks or data manipulation. The system's ability to detect subtle anomalies, track data lineage, and perform real-time corrective actions sets it apart from traditional security solutions, making it a crucial component for any organization deploying AI models in high-stakes environments. This invention addresses the need for a robust, scalable, and secure computation engine capable of maintaining the integrity of AI model outputs.

In a third aspect, an Intelligent System for Robust Detection of Accuracy Loss in Explainable-AI Systems Using Q-Entanglement Model-Matrix Frameworks is provided. These systems and processes are designed to detect, mitigate, and prevent accuracy downgrades in Explainable AI (XAI) systems by utilizing quantum entanglement principles in conjunction with a model-matrix framework. The invention addresses the challenges faced by XAI systems in maintaining reliable and accurate predictions, particularly when these systems are exposed to cyberattacks, poisoned data, or internal computational anomalies. By combining multiple advanced features such as quantum entanglement, swarm intelligence, dynamic scanning, and data integrity checks, the system provides a comprehensive framework for ensuring the robustness of AI outputs.

At the core of the invention is the quantum entanglement model-matrix analysis, which forms the foundation of the system's ability to detect computational anomalies. Quantum entanglement refers to the phenomenon where the state of one particle is instantaneously linked to the state of another, even at great distances. This principle is leveraged in the system to monitor the relationships between different data points and computational steps within the model-matrix framework. By tracking these relationships, the system can detect deviations or anomalies that could indicate data corruption or cyberattacks. If the entangled relationships between data points do not align with the expected pattern, the system flags this as an anomaly and takes corrective action.

One of the key features of this invention is its ability to track hash-key values throughout the computation process. In typical AI systems, hash keys are used to verify the integrity of the final output. However, this invention generates hash keys not only for the final output but also for the computational steps and formulas that lead to that output. This ensures that any manipulation or alteration of the computational process, such as changes to macros or algorithms, is immediately detected. If a hash-key value changes unexpectedly, the system identifies this as a potential security threat and triggers an alert. This provides an additional layer of protection against cyberattacks that target the internal workings of the AI system.

The system also includes real-time scanning for anomalies in the data processing pipeline. This continuous scanning feature monitors the flow of data and the computations being performed in real time. It looks for signs of data corruption, unauthorized access attempts, and computational errors that could lead to accuracy loss in the AI system's outputs. By scanning the system continuously, the invention ensures that any discrepancies are identified as soon as they occur, preventing errors from propagating through the system. The real-time scanning model is integrated with the quantum entanglement and hash-key tracking mechanisms, providing a unified approach to data security and anomaly detection.

A major component of the system is its ability to detect poisoned data before it can affect the AI model's predictions. Poisoned data refers to inputs that have been intentionally manipulated or corrupted to produce incorrect or misleading outputs. The quantum entanglement analysis is particularly effective in detecting poisoned data by analyzing the relationships between different data points in the model-matrix framework. If a data point is poisoned, its entangled relationship with other data points will deviate from the expected pattern, signaling the presence of manipulated data. Once poisoned data is detected, the system can either discard it or correct it before it is used in the AI model's computations.

The invention also includes a traceability matrix model that tracks the origin and processing history of each data point used in the AI model. This traceability feature allows the system to maintain a detailed record of the data pipeline, ensuring that any anomalies can be traced back to their source. The traceability matrix provides transparency and accountability, making it possible to identify the exact point where an anomaly occurred and take corrective action. This feature is particularly valuable in federated learning environments, where data is collected from multiple decentralized sources. By maintaining a clear record of data lineage, the system ensures that data integrity is preserved throughout the entire computation process.

The AI-swarm intelligence feature of the invention enhances its auditing and security capabilities. Swarm intelligence refers to the collective behavior of decentralized agents that work together to solve complex problems. In this system, AI agents collaborate to audit the data and computations in real time, distributing tasks efficiently across the system's resources. The swarm intelligence model enables the system to scale effectively, ensuring that data integrity checks are performed continuously, even in environments with large volumes of data. Each agent in the swarm is responsible for monitoring specific aspects of the data pipeline, and their collective actions ensure that the system remains secure and reliable.

The task distribution and component security model further optimizes the auditing process by distributing the workload among the system's resources. This model ensures that data integrity checks are performed efficiently, reducing the risk of bottlenecks or delays in the auditing process. By distributing the tasks across multiple components, the system ensures that even in large-scale AI environments, the auditing and security measures remain robust. The task distribution model also helps identify weak or compromised components within the system, allowing the system to take corrective action to maintain the overall security of the data pipeline.

A key aspect of this invention is its self-healing capability, which allows the system to automatically correct any detected anomalies. When an anomaly is identified, such as a deviation in the quantum entanglement relationships or a change in hash-key values, the system initiates corrective actions to resolve the issue. This may involve recalculating the affected data, reverting to a previous state, or generating alerts for system administrators. The self-healing feature ensures that the AI model can continue to operate reliably, even in the presence of external threats or internal data corruption.

The dynamic digital immune system (DDIS) integrated into this invention plays a crucial role in maintaining data quality and security. The DDIS continuously monitors the data being processed, identifying and flagging any data that appears to be anomalous or of poor quality. Once flagged, the data is subjected to further scrutiny through the system's auditing and traceability mechanisms. The DDIS also applies dynamic encryption to sensitive data, ensuring that it is protected from unauthorized access. By integrating these security features with the quantum entanglement and swarm intelligence models, the system provides a comprehensive solution for ensuring the accuracy and reliability of AI outputs.

The model-matrix computation engine is another critical component of this invention. This engine processes the data matrices using the quantum entanglement model, ensuring that any deviations or anomalies are detected early in the computation process. The engine monitors the relationships between data points and computations, ensuring that the AI model's predictions are based on valid and uncorrupted data. The model-matrix computation engine also integrates with the hash-key tracking and traceability matrix features, providing a unified approach to maintaining data integrity throughout the computation process.

The system's continuous scanning for security threats ensures that the AI model is protected from external attacks and internal anomalies. This scanning model continuously monitors the data pipeline for any signs of data tampering, computational errors, or unauthorized access attempts. The continuous scanning feature is integrated with the hash-key tracking and quantum entanglement anomaly detection systems, allowing the system to identify and mitigate potential threats in real time. By scanning the system continuously, the invention ensures that the AI model remains secure and reliable, even in the face of evolving security threats.

The core inventive features of this system include quantum entanglement model-matrix analysis, hash-key tracking, continuous scanning for anomalies, AI-swarm intelligence, traceability matrix, self-healing capability, and dynamic digital immune system integration. These features work together to provide a comprehensive framework for detecting, mitigating, and preventing accuracy loss in Explainable AI systems. The system's ability to detect and correct anomalies in real time ensures that AI models produce reliable, transparent, and accurate outputs, even in the presence of external or internal threats.

Sample key functionality associated with this invention include quantum entanglement, model-matrix framework, accuracy loss detection, hash-key tracking, continuous scanning, AI-swarm intelligence, self-healing, poisoned data detection, a traceability matrix, etc. The foregoing reflects samples core functionalities of the systems and processes and highlight their role in improving the security and reliability of AI systems.

This invention provides a highly sophisticated approach to detecting and mitigating accuracy loss in Explainable AI systems. By integrating quantum entanglement principles with advanced data security features, the system ensures that AI models operate reliably, even when faced with data corruption, computational anomalies, or cyberattacks. The system's ability to detect anomalies at both the data and computational levels, track data lineage, and perform real-time corrective actions sets it apart from traditional security solutions, making it a crucial component for any organization that relies on AI for critical decision-making processes. This invention addresses the need for a robust, scalable, and secure framework for maintaining the integrity of AI model outputs in complex and high-stakes environments.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

First, in some arrangements, a system for enhancing data integrity and quality assurance in Explainable AI (XAI) systems comprises a data collection module that is configured to receive data from distributed sources during federated training processes, monitoring and aggregating the incoming data in real time. The data collection module ensures privacy and security during transmission. The system also includes an anomaly detection module that detects and flags corrupted, poisoned, or low-quality data using dynamic anomaly detection algorithms. The anomaly detection module further improves its anomaly detection capabilities by learning from historical data and feedback, classifying flagged data into categories such as data poisoning, irrelevant data, and inconsistent data. It dynamically adjusts detection thresholds based on the volume and quality of the data. The system also includes an automated data cleaning module that removes redundant, irrelevant, and unnecessary data from the flagged data. The system applies encryption to sensitive data using a dynamic encryption module that automatically manages encryption keys. The system includes a traceability matrix module that tracks data origin and processing, enabling transparency. Additionally, a task distribution module implements swarm intelligence for decentralized auditing, and a self-healing module automatically corrects detected anomalies and restores the AI model's data pipeline.

In some arrangements, the anomaly detection module comprises a machine learning-based sub-system that continuously improves its ability to detect data anomalies. It learns from historical data patterns and feedback from previously detected anomalies, enabling the system to refine its detection process over time.

In some arrangements, the anomaly detection module classifies flagged data into multiple categories, including data poisoning, irrelevant data, low-quality data, and inconsistent data. Each of these categories triggers a specific level of response based on the severity and potential impact of the anomaly on the AI model's performance.

In some arrangements, the anomaly detection module incorporates a threshold-based detection system. The thresholds for flagging data anomalies are dynamically adjusted based on the volume and quality of the incoming data, ensuring the system can adapt to varying data conditions in real time.

In some arrangements, the automated data cleaning module includes a redundancy elimination sub-module. The redundancy elimination sub-module is configured to identify and remove duplicate data entries from the flagged data, reducing data redundancy and improving the efficiency of AI model computations.

In some arrangements, the automated data cleaning module applies statistical filtering techniques for noise reduction. These techniques remove random variations and inconsistencies from the flagged data, improving the signal-to-noise ratio and enhancing data quality.

In some arrangements, the automated data cleaning module includes a relevance assessment function that evaluates the significance of each flagged data point. The relevance of each data point is assessed based on predefined criteria, and irrelevant data is discarded to streamline data processing and improve the accuracy of the AI model.

In some arrangements, the dynamic encryption module applies multi-layer encryption protocols. These protocols combine symmetric and asymmetric encryption techniques, ensuring enhanced security for sensitive data throughout the federated learning process.

In some arrangements, the dynamic encryption module includes an encryption key management sub-module. The key management sub-module is configured to automatically rotate and manage encryption keys based on the sensitivity of the data being processed, ensuring robust data security.

In some arrangements, the traceability matrix module provides a visualization interface that allows system administrators to view the processing history of each data point. The visualization interface enhances transparency by enabling administrators to track data transformations and origins.

In some arrangements, the traceability matrix module integrates with external auditing and compliance systems. This integration enables the system to generate detailed reports on data lineage and compliance with data governance regulations.

In some arrangements, the task distribution module optimizes the assignment of auditing tasks across distributed agents. It ensures efficient auditing by dynamically reallocating tasks based on the performance of agents and system load.

In some arrangements, the task distribution module monitors the performance of agents. The system identifies underperforming or compromised agents and reallocates their tasks to other agents, ensuring uninterrupted and accurate data integrity auditing.

In some arrangements, the self-healing module includes a rollback function. This rollback function restores the AI model's data pipeline to a previously validated state when irreparable anomalies are detected, preventing the further propagation of corrupted data within the system.

In some arrangements, the self-healing module incorporates a predictive analytics sub-module. The predictive analytics sub-module anticipates potential anomalies by analyzing historical anomaly patterns, allowing the system to preemptively address issues before they affect the AI model.

In some arrangements, the self-healing module generates notifications for system administrators whenever anomalies are detected and corrected. It provides detailed logs of the corrective actions taken, the anomalies detected, and the impact on the data pipeline.

In some arrangements, the system includes integration with external data quality management tools. This integration allows the system's data integrity processes to seamlessly coordinate with external platforms that monitor, validate, and govern data quality in AI and machine learning environments.

In some arrangements, a system for enhancing data integrity and quality assurance in Explainable AI (XAI) systems comprises a data collection module that receives data from distributed sources during federated training processes. The data collection module monitors and aggregates the incoming data in real time, ensuring privacy and security during transmission. The system also includes an anomaly detection module that detects and flags corrupted, poisoned, or low-quality data using dynamic anomaly detection algorithms. The anomaly detection module further improves its detection capabilities by learning from historical data and feedback. It classifies flagged data into categories such as data poisoning, irrelevant data, low-quality data, and inconsistent data, dynamically adjusting detection thresholds based on the volume and quality of the incoming data. The system further comprises an automated data cleaning module that removes redundant, irrelevant, and unnecessary data from the flagged data, improving the quality and performance of the AI model inputs.

In addition, the system includes a dynamic encryption module that applies adaptive encryption protocols to sensitive data in real time, managing encryption keys automatically based on the sensitivity of the data. The system also includes a traceability matrix module that tracks and logs the data's origin and transformation, enabling transparency and providing system administrators with a visualization interface to monitor the data processing history. A task distribution module implements swarm intelligence for decentralized auditing, dynamically reallocating auditing tasks across distributed agents based on system load and agent performance. Lastly, the system includes a self-healing module that automatically corrects detected anomalies in real time, restoring the AI model's data pipeline and preventing the propagation of corrupted data.

Additionally, the system integrates a machine learning sub-system within the anomaly detection module. This sub-system continuously improves anomaly detection capabilities by learning from historical anomalies, adjusting detection thresholds dynamically, and refining the detection process over time based on real-time feedback and evolving data conditions. Through this combination of dynamic learning, real-time detection, and continuous improvement, the system is able to adapt to changing data patterns and maintain high standards of data integrity and quality assurance throughout the AI computation process.

In some arrangements, a method for enhancing data integrity and quality assurance in Explainable AI (XAI) systems involves receiving data from distributed sources during federated training processes, where the data is continuously monitored and aggregated in real time to ensure privacy and security during transmission. The method includes detecting and flagging corrupted, poisoned, irrelevant, or low-quality data using dynamic anomaly detection algorithms. The anomaly detection module improves its capabilities by learning from historical data patterns and feedback, classifying flagged data into categories such as data poisoning, irrelevant data, low-quality data, and inconsistent data, and dynamically adjusting detection thresholds based on the volume and quality of the data.

The method further includes cleaning the flagged data using an automated data cleaning process that removes redundant, irrelevant, and unnecessary data, enhancing the quality of inputs for the AI model. Sensitive data is secured through the application of adaptive encryption protocols managed by a dynamic encryption module, which automatically adjusts encryption keys based on the sensitivity of the data. The method includes tracking and logging the data's origin and processing history using a traceability matrix, which provides transparency and enables system administrators to monitor the data flow. Additionally, the method includes distributing auditing tasks across a decentralized network using swarm intelligence and real-time task reallocation to optimize auditing efficiency. The method concludes with correcting detected anomalies through a self-healing mechanism that performs real-time corrective actions to restore the AI model's data pipeline and prevent further data corruption.

In some arrangements, the method further comprises dynamically rotating encryption keys based on the sensitivity of the data being processed. The dynamic encryption module automatically manages key rotation, enhancing data security by minimizing risks associated with static encryption keys. Additionally, the method continuously adjusts anomaly detection thresholds in real time based on feedback received from previous detections and corrections. This ensures that the anomaly detection process remains adaptive, improving both the security of sensitive data and the accuracy of anomaly detection capabilities as the system evolves over time.

Second, in some arrangements, a system for detecting and mitigating accuracy downgrades in Explainable AI (XAI) systems using quantum entanglement and model-matrix frameworks comprises a data input module configured to receive data matrices from distributed sources during the computation process. The data input module securely transmits the data to the computation engine, ensuring that data integrity is maintained during transmission. The system also includes a quantum entanglement-based anomaly detection module that analyzes relationships between data points in the model-matrix computation. The module applies quantum entanglement principles to monitor the entangled states of the data points, detect deviations from expected patterns, and flag anomalous data points for further analysis when deviations exceed predefined thresholds.

In some arrangements, the system includes a hash-key tracking module that generates and maintains hash keys for each computational step and final result within the model-matrix computation process. The hash-key tracking module verifies the integrity of both the data and the computational process by comparing hash keys with expected values, triggering alerts when discrepancies are detected. The system also incorporates a continuous scanning module that monitors the computation process in real time, scanning for cyberattacks, computational anomalies, or data poisoning, and cross-referencing quantum entanglement analysis results with hash-key outcomes to identify discrepancies. The system categorizes detected anomalies by severity and triggers immediate corrective actions for critical issues.

In some arrangements, the system includes a traceability matrix module that tracks and logs the lineage and transformations of data points throughout the computation process. This module maintains detailed records of the origin and processing history of each data point and provides real-time visualizations for system administrators to monitor the entire data lifecycle. The system also includes an AI-swarm intelligence module that distributes anomaly detection and auditing tasks across a decentralized network of agents. This module optimizes the assignment of tasks, facilitates collaboration between agents for cross-validation of anomalies, and redistributes tasks in real time to balance system load.

In some arrangements, the system includes a self-healing module that automatically corrects anomalies detected in the computation process. The self-healing module performs real-time corrective actions, including recalculating flagged data points or reverting computations to a previously validated state. It also includes a rollback function that restores the computation pipeline to a prior safe state when critical anomalies are detected, preventing the propagation of corrupted data. The system ensures data continuity by integrating with external backup and restoration systems, automatically recovering data and computations from secure backups.

In some arrangements, the system includes a machine learning sub-system within the quantum entanglement-based anomaly detection module. This sub-system continuously improves anomaly detection capabilities by learning from historical data, adjusting entanglement thresholds dynamically, and refining detection models to adapt to evolving data characteristics.

In some arrangements, the system includes a multi-layered entanglement tracking feature, wherein the anomaly detection module monitors relationships between data points across different layers of the model-matrix framework, enabling the detection of subtle anomalies in both macro and micro-level data. The system also includes a key rotation mechanism in the hash-key tracking module, which dynamically rotates encryption keys at predefined intervals to prevent vulnerabilities and ensures secure hash-key verification throughout the computation process.

In some arrangements, the system includes a multi-factor authentication (MFA) system within the hash-key tracking module to verify the legitimacy of the data and the formulas applied during computation. This MFA system applies multiple layers of authentication to ensure the integrity of the entire computational process, flagging any suspicious activity or manipulation attempts.

In some arrangements, the continuous scanning module incorporates an anomaly prioritization engine that assigns priority levels to detected anomalies based on their severity and potential impact on the AI model's accuracy. The system prioritizes high-risk anomalies for immediate corrective action while lower-risk issues are queued for deferred analysis.

In some arrangements, the system includes a predictive analytics sub-module within the continuous scanning module. This sub-module applies predictive models based on historical anomaly patterns to proactively identify vulnerabilities in the computation process and flag potential risks before they occur.

In some arrangements, the traceability matrix module integrates with external regulatory compliance platforms, automatically generating compliance reports and verifying the system's adherence to industry standards. The system enables real-time auditing of data integrity and provides interactive visualizations of the data flow and flagged anomalies.

In some arrangements, the AI-swarm intelligence module includes a load-balancing mechanism that dynamically reallocates tasks based on agent availability and performance. This module monitors agent performance in real time, redistributing tasks to ensure efficient use of system resources and prevent bottlenecks.

In some arrangements, the AI-swarm intelligence module implements a collaborative anomaly validation system, allowing agents to communicate in real time and cross-validate flagged anomalies. This system enhances anomaly detection accuracy by leveraging the combined intelligence of multiple agents working collaboratively.

In some arrangements, the system's self-healing module incorporates a deep-learning corrective system that analyzes the root causes of anomalies and generates optimized corrective actions. This system continuously improves its ability to address future anomalies based on prior corrective actions and updates its models accordingly.

In some arrangements, the self-healing module includes a rollback sub-module that reverts the computation pipeline to a previously validated state when critical anomalies are detected. This prevents further propagation of compromised data, ensuring that the AI model remains reliable and accurate.

In some arrangements, the system integrates with external backup and restoration systems, automatically restoring compromised data or processes from verified backups in the event of a critical system failure. This integration ensures data continuity and minimizes disruption to the AI system.

In some arrangements, the self-healing module generates real-time notifications for system administrators whenever anomalies are detected and corrected. It provides detailed logs of the corrective actions taken, the root cause of the anomaly, and the impact on the computation pipeline, ensuring full transparency of the correction process.

In some arrangements, a system for detecting and mitigating accuracy downgrades in Explainable AI (XAI) systems using quantum entanglement and model-matrix frameworks comprises a data ingestion module configured to receive data matrices from distributed sources during the training and inference phases of an AI model. The data ingestion module verifies the authenticity and integrity of the incoming data through a multi-layered validation process, employing secure communication protocols to protect the data during transmission. The module applies cryptographic hashing techniques to check for data corruption and scans for tampering, ensuring only validated data enters the AI computation pipeline.

In some arrangements, the system includes a quantum entanglement-based anomaly detection module that monitors relationships between data points in the model-matrix computation, applying quantum entanglement principles to track entangled states. The module detects deviations from expected entanglement patterns, indicating anomalies, manipulation, or data poisoning. It also uses a multi-layered entanglement tracking system to monitor anomalies at both macro and micro levels, dynamically adjusting detection thresholds based on real-time feedback. The anomaly detection module flags any data points where deviations exceed predefined thresholds, triggering further investigation.

In some arrangements, the system further comprises a hash-key tracking module that generates and manages hash keys for each computational step and final result within the AI model-matrix framework. The hash-key tracking module generates keys based on the data used, the formulas applied, and the computational results, verifying data and process integrity by comparing the keys to expected values. When discrepancies in hash keys are detected, alerts are triggered, indicating potential data corruption or unauthorized modification. The module encrypts the generated hash keys during transmission and storage, ensuring security, and dynamically rotates encryption keys at predefined intervals to prevent vulnerabilities.

In some arrangements, the system includes a continuous scanning module that monitors the computation pipeline and AI inference processes in real time. The continuous scanning module scans for anomalies, accuracy degradation, or data poisoning. It cross-references results from the quantum entanglement anomaly detection with hash-key tracking outcomes to detect inconsistencies. Anomalies are categorized by severity, with high-priority anomalies triggering immediate corrective actions and lower-priority issues queued for deferred resolution. The module also uses predictive analytics to anticipate future vulnerabilities based on historical anomaly patterns and proactively flags potential risks.

In some arrangements, the system includes a traceability matrix module that tracks the lineage of each data point processed by the AI system. The traceability matrix module logs the origin, transformation, and processing history of each data point and provides real-time visualizations to system administrators, highlighting areas where anomalies have been flagged. The module integrates with external compliance platforms, automatically generating reports on data integrity and regulatory adherence, enabling system administrators to trace and isolate compromised data points quickly.

In some arrangements, the system includes an AI-swarm intelligence module that distributes anomaly detection and auditing tasks across a decentralized network of agents. The AI-swarm intelligence module assigns tasks in real time based on system load and agent availability, dynamically reallocating tasks as needed to ensure efficient processing. Agents collaborate in real time to cross-validate flagged anomalies, improving detection accuracy, and the system redistributes tasks when agent performance drops or system load increases to balance resources. Collaboration between agents also facilitates the investigation of complex anomalies.

In some arrangements, the system includes a self-healing module that automatically corrects anomalies detected during the computation process. The self-healing module performs real-time corrective actions, including recalculating flagged data points, restoring the system to a previously validated state, or discarding compromised data to prevent further propagation of errors. The self-healing module also includes a rollback function that halts further processing when critical anomalies are detected, reverting the computation pipeline to a prior safe state.

In some arrangements, the system incorporates a deep-learning corrective system within the self-healing module. The deep-learning system analyzes the root causes of detected anomalies and generates optimized corrective actions, continuously learning from each anomaly and improving future responses based on past corrective actions. The self-healing module also integrates with external backup and restoration systems to recover compromised data from secure, verified backups in the event of critical failures, ensuring data continuity.

In some arrangements, the system generates detailed logs and real-time alerts for system administrators whenever anomalies are detected and corrected. These logs provide full transparency of the anomaly resolution process, detailing the corrective actions taken, the root cause of the anomaly, and the overall impact on the AI model.

In some arrangements, a method for detecting and mitigating accuracy loss in Explainable AI (XAI) systems using quantum entanglement and model-matrix frameworks comprises receiving data matrices from distributed sources during the AI model's training and inference phases. The data ingestion module securely transmits the data to the computation engine after verifying its authenticity and integrity using cryptographic hashing techniques and multi-layered validation processes. The data ingestion module ensures that only validated data enters the AI computation pipeline.

In some arrangements, the method includes analyzing relationships between data points in the model-matrix computation using a quantum entanglement-based anomaly detection module. The anomaly detection module applies quantum entanglement principles to monitor the entangled states of the data points and detect deviations from expected patterns that indicate anomalies, data poisoning, or manipulation. The system flags anomalous data points for further investigation and applies a multi-layered tracking system to detect anomalies at both macro and micro levels. Anomaly detection thresholds are dynamically adjusted based on feedback from previous detection outcomes.

In some arrangements, the method includes generating and verifying hash keys for each computational step within the AI model using a hash-key tracking module. The module generates hash keys based on the input data and computational steps, compares them to expected values to verify data and process integrity, and encrypts the hash keys for secure transmission and storage. The method also includes dynamically rotating encryption keys at predefined intervals to enhance security and prevent vulnerabilities.

In some arrangements, the method includes scanning the computation pipeline and model-matrix framework in real time using a continuous scanning module. The scanning module monitors for anomalies, cross-referencing quantum entanglement-based detection results with hash-key tracking outcomes. Detected anomalies are categorized by severity, and corrective actions are initiated for critical issues while lower-priority issues are queued for deferred analysis. The scanning module also applies predictive analytics to anticipate future vulnerabilities based on historical data, proactively flagging potential risks for preemptive corrective actions.

In some arrangements, the method includes tracking the full lineage of data points processed by the AI system using a traceability matrix module. This module logs the origin, transformation, and processing history of each data point, providing system administrators with real-time visualizations of data flow and highlighting areas where anomalies have been flagged. The method further integrates the traceability module with external compliance platforms to generate automated reports on data integrity and regulatory adherence.

In some arrangements, the method includes distributing anomaly detection and auditing tasks across a decentralized network of agents using an AI-swarm intelligence module. Tasks are assigned in real time based on agent availability and system load, and the system dynamically reallocates tasks as needed to balance resources. Agents collaborate in real time to cross-validate flagged anomalies and resolve complex anomalies that span multiple layers of the data matrix.

In some arrangements, the method includes automatically correcting detected anomalies using a self-healing module. The self-healing module performs real-time corrective actions, recalculating flagged data points or restoring the system to a previously validated state. It includes a rollback sub-module that reverts the computation process to a prior safe state when critical anomalies are detected, preventing further propagation of compromised data.

In some arrangements, the method further comprises incorporating a machine learning sub-system within the quantum entanglement-based anomaly detection module. The machine learning sub-system improves the anomaly detection process by applying supervised learning to refine entanglement thresholds, unsupervised learning to detect previously unknown anomalies, and reinforcement learning to adjust detection models based on the outcomes of prior corrective actions. The sub-system continuously updates its models to adapt to new data characteristics and emerging threats.

In some arrangements, the method includes applying predictive detection techniques using a predictive analytics sub-module within the continuous scanning module. The sub-module analyzes historical anomaly patterns to predict future vulnerabilities in the computation process, flags potential risks for preemptive corrective actions, and continuously refines its prediction algorithms based on feedback from anomaly detection and correction processes.

Third, in some arrangements, a system for detecting and mitigating accuracy downgrades in Explainable AI (XAI) systems using quantum entanglement and model-matrix frameworks comprises a data ingestion module configured to receive data matrices from distributed sources during the training and inference phases of an AI model. The data ingestion module securely transmits the data to the computation engine, ensuring data integrity is maintained by employing multi-layered validation processes and secure communication protocols, including cryptographic hashing techniques to check for tampering or corruption. The system ensures that only authenticated and validated data is processed.

In some arrangements, the system includes a quantum entanglement-based anomaly detection module that monitors relationships between data points in the model-matrix framework. The module applies quantum entanglement principles to track the entangled states of the data points, detecting deviations from expected patterns that signal anomalies, data poisoning, or computational manipulation. It uses a multi-layered tracking system to detect both macro and micro-level anomalies and dynamically adjusts detection thresholds based on feedback from previous detections. The module flags anomalous data points for further investigation if deviations exceed predefined tolerances.

In some arrangements, the system further includes a hash-key tracking module configured to generate and manage hash keys for each computational step and final result within the AI model-matrix framework. The hash-key tracking module generates keys based on the input data, formulas applied, and intermediate computation results, verifying the integrity of both the data and the process by comparing hash keys to expected values. If discrepancies are detected, alerts are triggered to signal potential tampering. The module encrypts the hash keys during transmission and storage, dynamically rotating encryption keys at predefined intervals to enhance security.

In some arrangements, the system includes a continuous scanning module configured to monitor the AI computation process in real time. The continuous scanning module continuously scans data matrices and computation steps for signs of anomalies, accuracy degradation, or data poisoning, cross-referencing results from the quantum entanglement-based anomaly detection module and the hash-key tracking module to detect discrepancies. Detected anomalies are prioritized by severity, with critical issues triggering immediate corrective actions, while lower-priority issues are deferred. The module applies predictive scanning to anticipate future vulnerabilities based on historical patterns, proactively flagging potential areas of risk.

In some arrangements, the system includes a traceability matrix module that tracks the lineage and transformations of data points processed by the AI system. The traceability matrix maintains a detailed record of the origin, transformations, and processing history of each data point and provides real-time visualizations to system administrators, highlighting flagged anomalies and enabling administrators to trace the root cause of data integrity issues. The module integrates with external regulatory and compliance platforms to generate automated reports on data lineage, integrity, and compliance.

In some arrangements, the system includes an AI-swarm intelligence module that distributes anomaly detection and auditing tasks across a decentralized network of agents. This module dynamically assigns tasks based on system load and agent availability, optimizing processing efficiency. The agents collaborate in real time, cross-validating flagged anomalies to enhance detection accuracy, and the system reallocates tasks dynamically to prevent bottlenecks or duplicated efforts.

In some arrangements, the system includes a self-healing module configured to automatically correct anomalies detected during the computation process. The self-healing module performs real-time corrective actions, including recalculating flagged data points, restoring the AI model to a validated state, or discarding compromised data to prevent further propagation of errors. The module includes a roll-back function that reverts the computation process to a prior safe state when critical anomalies are detected, preventing further impact on the AI model's performance.

In some arrangements, the system incorporates a deep-learning corrective sub-system within the self-healing module. This deep-learning system analyzes the root causes of anomalies and generates optimized corrective actions. The system learns from each corrective event, improving future anomaly responses, and integrates with external backup and restoration systems to recover data from secure, verified backups in the event of critical failures, ensuring continuity.

In some arrangements, the system generates detailed logs and real-time alerts for system administrators when anomalies are detected and corrected. These logs provide full transparency, documenting the detected anomalies, corrective actions taken, root cause analysis, and the impact on the computation pipeline.

In some arrangements, a method for detecting and mitigating accuracy downgrades in Explainable AI (XAI) systems using quantum entanglement and model-matrix frameworks involves receiving data matrices from distributed sources during AI model training and inference. The data ingestion module securely transmits the data to the computation engine, ensuring its authenticity and integrity through cryptographic hashing and multi-layered validation processes. The system only processes validated and secure data.

In some arrangements, the method involves analyzing relationships between data points in the model-matrix framework using a quantum entanglement-based anomaly detection module. The anomaly detection module applies quantum entanglement principles to track the entangled states of data points and detect deviations from expected patterns, indicating anomalies, data poisoning, or manipulation. The system flags anomalous data points for further investigation and uses a multi-layered tracking system to monitor for both macro and micro-level anomalies. Detection thresholds are dynamically adjusted based on feedback from previous detections and corrections.

In some arrangements, the method includes generating hash keys for each computational step within the AI model using a hash-key tracking module. The module generates hash keys based on the data and computational steps, compares them with expected values to verify integrity, and triggers alerts when discrepancies are detected. The method also includes encrypting the hash keys during transmission and storage and dynamically rotating encryption keys at predefined intervals to ensure data security and prevent tampering.

In some arrangements, the method includes continuously scanning the AI computation pipeline for anomalies using a continuous scanning module. This module monitors the pipeline for signs of data poisoning, accuracy degradation, or computational errors. It cross-references anomaly detection results from the quantum entanglement-based module and hash-key tracking outcomes to identify discrepancies. Anomalies are prioritized by severity, and critical issues are addressed immediately, while lower-priority anomalies are queued for later resolution. The module also applies predictive analytics to anticipate vulnerabilities and flag potential risks for preemptive corrective actions.

In some arrangements, the method includes tracking the full lineage and transformation history of data points processed by the AI system using a traceability matrix module. The traceability matrix logs the origin, transformations, and processing history of each data point, providing real-time visualizations for system administrators. The method highlights flagged anomalies within the matrix and integrates with compliance platforms to generate automated reports on data integrity and regulatory adherence.

In some arrangements, the method distributes anomaly detection and auditing tasks across a decentralized network of agents using an AI-swarm intelligence module. The module dynamically reallocates tasks based on agent performance and system load. Agents collaborate in real time, cross-validating anomalies to enhance detection accuracy, and complex anomalies that span multiple layers are collaboratively investigated by multiple agents.

In some arrangements, the method includes automatically correcting detected anomalies using a self-healing module. The self-healing module performs corrective actions in real time, recalculating flagged data points or reverting the computation pipeline to a prior validated state. It includes a rollback function that halts further computation when critical anomalies are detected, preventing the propagation of corrupted data.

In some arrangements, the method includes improving anomaly detection using a machine learning sub-system within the quantum entanglement-based anomaly detection module. The machine learning sub-system applies supervised learning to refine entanglement thresholds, uses unsupervised learning to detect previously unknown anomalies, and employs reinforcement learning to adjust detection models based on feedback from the self-healing module.

In some arrangements, the method applies proactive detection techniques using a predictive analytics sub-module within the continuous scanning module. The predictive analytics sub-module analyzes historical anomaly data to predict potential vulnerabilities and flag areas of the computation process most likely to experience accuracy degradation. It anticipates risks before they materialize, allowing preemptive corrective actions to prevent future issues.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a logic diagram illustrating the flow of data through an Explainable AI system, including key modules such as data collection, federated server processing, dynamic digital immune system (DDIS), data flagging, and audit processes, with additional emphasis on security, task distribution, matrix computation, and quantum entanglement.

FIG. 2 depicts a flow diagram showing the computational data model for result processing, incorporating quantum entanglement, hash-key validation, traceability matrix model integration, anomaly detection, self-healing, and reporting mechanisms, with steps to handle computational variances, manipulation detection, and responses to integrity challenges.

FIG. 3 depicts the process flow of AI swarm intelligence for task distribution and security. It outlines the steps involved in defining the problem, analyzing potential threats, developing swarm algorithms, and continuously monitoring and adapting agent performance to ensure task reliability and system security.

FIG. 4 depicts a system diagram for an Explainable AI Enhancement System, labeled as 400, which integrates various modules to ensure data integrity and system efficiency. These modules include a data collection module (410), anomaly detection module (412), automated data cleaning module (414), dynamic encryption module (408), traceability matrix module (404), task distribution module (406), and self-healing module (402), each performing distinct roles to enhance the AI system's functionality and security.

FIG. 5 depicts a system diagram for detecting and mitigating accuracy downgrades in Explainable AI (XAI) systems using quantum entanglement and model-matrix frameworks. The system consists of several key modules including a data input module (500), quantum entanglement anomaly detection module (514), hash key tracking module (502), continuous scanning module (504), traceability matrix module (508), AI swarm intelligence module (510), and self-healing module (506), all working together to ensure data integrity and system reliability.

FIG. 6 depicts a system designed for detecting and mitigating accuracy loss in Explainable AI (XAI) systems using quantum entanglement and model-matrix frameworks. It includes several key modules such as the data ingestion module (612), quantum entanglement anomaly detection module (614), hash key tracking module (602), continuous scanning module (604), traceability matrix module (608), AI swarm intelligence module (610), and self-healing module (606), all working together to enhance system reliability, ensure data integrity, and maintain AI model accuracy.

DETAILED DESCRIPTION

As an overview and at a high level, a first aspect of this disclosure centers on enhancing the integrity and accuracy of Explainable AI (XAI) models by leveraging quantum entanglement-based anomaly detection. This approach enables the system to continuously monitor the relationships between data points as they traverse through the model-matrix framework. By applying quantum principles, the system detects deviations from expected patterns that could indicate issues such as data poisoning, computational errors, or manipulation of the input data. One of the unique advantages of this approach is its sensitivity to even the most subtle deviations, as quantum entanglement principles provide a much deeper level of analysis into how data points are connected within the AI system. This allows the system to flag anomalies that might otherwise go undetected, ensuring that the AI model remains reliable and accurate.

A core component of this process is the hash-key tracking module, which generates unique hash keys at every stage of the computation process. Unlike traditional methods that may only verify the final result of a computation, this module tracks the integrity of data throughout the entire computational pipeline. By creating and verifying hash keys at every step, the system ensures that both the data and the methods used to process that data are secure. These hash keys are compared against expected values, and any discrepancy triggers an alert, signaling a potential issue. The system goes a step further by encrypting the hash keys and the data they protect, ensuring that the integrity of the computation is preserved even during transmission or storage.

Another crucial aspect of this system is the continuous scanning module, which provides real-time monitoring of the AI computation pipeline. This module is responsible for detecting cyberattacks, data degradation, or computational inconsistencies. It continuously scans the data and compares the results from quantum anomaly detection with those from the hash-key verification process, identifying any mismatches. Anomalies are categorized based on their severity, allowing the system to prioritize critical issues for immediate correction, while less urgent discrepancies are queued for later review. This ensures that the system can maintain its focus on the most significant threats without overwhelming resources with less critical anomalies.

Furthermore, the system incorporates a traceability matrix module designed to track the complete lineage of each data point processed by the AI model. This module maintains a detailed log of each data point's origin, the transformations it undergoes, and its final output. The traceability matrix allows system administrators to trace any anomalies back to their source, providing transparency and making it easier to identify and correct issues. This level of data transparency is essential in environments where the integrity of data is paramount, such as in financial modeling, autonomous systems, and decision support systems. It also adds an additional layer of security by ensuring that any changes or anomalies within the data pipeline are documented and can be audited.

The self-healing module is another key component of this aspect, providing automatic correction of anomalies as soon as they are detected. When the system identifies an anomaly, the self-healing module initiates corrective actions such as recalculating affected data points or rolling the system back to a previously validated state. By halting further computations when critical anomalies are found, the system prevents the propagation of compromised data throughout the AI model. The rollback function ensures that the system can revert to a safe state before any corruption affects the model's outputs. This capability is especially critical in real-time AI applications where even minor errors could have far-reaching consequences.

The second aspect of the system shifts focus to a decentralized method of anomaly detection and auditing, leveraging AI-swarm intelligence. In this model, tasks related to anomaly detection and auditing are distributed across a network of agents, which work together in parallel. Each agent is assigned a portion of the data to analyze, and the system dynamically reallocates tasks based on system load and agent availability. This parallelized approach allows the system to process large datasets more efficiently than traditional centralized models, as multiple agents can work on different parts of the data simultaneously. The AI-swarm intelligence approach not only speeds up the detection process but also ensures that no single agent is overwhelmed with too many tasks.

The AI-swarm intelligence module also includes a sophisticated load-balancing mechanism that continuously monitors the performance of each agent and redistributes tasks accordingly. This prevents bottlenecks that could slow down the anomaly detection process and ensures that the system makes full use of available resources. As the system detects imbalances in task distribution, it reallocates tasks to under-utilized agents or reduces the workload on overburdened agents. This real-time adjustment of tasks ensures that the system operates as efficiently as possible, even under heavy data loads.

Collaboration between agents is another vital element of this aspect. When agents detect anomalies, they can communicate with each other in real time to cross-validate their findings. This collaborative effort improves the accuracy of anomaly detection, as multiple agents can verify whether a flagged anomaly is legitimate or whether it may have been a false positive. When an anomaly spans multiple layers of the data model or is too complex for a single agent to handle, multiple agents can work together to resolve the issue. This collaborative approach ensures that even the most complex and deeply embedded anomalies are detected and corrected.

The third aspect of the system addresses security concerns related to the processing of matrix data, which is commonly used in AI models to manage relationships between data points. Matrix computations are particularly vulnerable to manipulation, as attackers can alter formulas or data relationships without affecting the final output in an obvious way. This allows attackers to bypass traditional security measures that focus only on the output of computations. To counteract this, the system implements a method of generating hash keys not only for the final result but also for the computational steps and formulas used to produce that result. This ensures that any tampering with the computational process is detected, even if the final output remains unchanged.

The system also tackles the "try and escape" problem, a technique where attackers repeatedly manipulate a system to test its detection mechanisms. In traditional systems, attackers may alter the computation process but maintain the same final output, allowing them to evade detection if the integrity check only examines the final result. The system addresses this by generating hash keys at every step of the computation process. By verifying each step, the system ensures that any alteration in the computational process is flagged, even if the final output appears correct. This approach prevents attackers from escaping detection by manipulating intermediate steps.

To enhance the security of the hash-key verification process, the system incorporates advanced encryption techniques. Hash keys and computational data are encrypted during both transmission and storage, and encryption keys are rotated dynamically at predefined intervals or based on the sensitivity of the data. This dynamic key rotation prevents attackers from targeting static encryption keys, ensuring that even if one key is compromised, it cannot be reused to manipulate future computations. The constant rotation of encryption keys adds an additional layer of security to the system, making it more resistant to external attacks.

The system further strengthens its security measures through the use of predictive analytics. By analyzing historical patterns of anomaly detection, the system can identify areas where future anomalies are likely to occur and take preemptive action to prevent them. This proactive approach allows the system to flag potential vulnerabilities before they are targeted, reducing the risk of future attacks. The predictive analytics module also helps refine the anomaly detection models, enabling the system to adapt to new types of threats as they emerge.

Together, these three aspects provide a comprehensive approach to ensuring the integrity, accuracy, and security of AI systems. The integration of quantum entanglement-based anomaly detection, decentralized auditing with AI-swarm intelligence, and enhanced matrix computation security creates a robust framework capable of addressing the most pressing challenges associated with data integrity, computational errors, and cyberattacks. This holistic approach not only safeguards AI models but also enhances their reliability and transparency, making them more suitable for deployment in critical applications such as financial systems, autonomous vehicles, and other high-stakes industries. Through the implementation of these advanced techniques, the system is positioned to meet the growing demand for secure, transparent, and accurate AI-driven decision-making across a wide range of sectors.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 presents a detailed logic diagram that represents the comprehensive architecture of an intelligent system designed to detect and mitigate accuracy loss in Explainable AI (XAI) systems through the application of quantum entanglement model-matrix frameworks. The process commences at element 100, where data collection initiates, gathering raw data from multiple distributed sources. The system is engineered to handle data from varied inputs, including real-time streams and batch inputs, ensuring the robustness and flexibility required for modern AI applications. This incoming data is transferred to a federated server, illustrated by element 102, which acts as a central repository for compiling data from decentralized nodes. The federated server plays a pivotal role in ensuring that the data remains secure during aggregation and that the distributed nature of data collection does not compromise its integrity. The use of a federated architecture allows the system to maintain data privacy and security, as raw data does not need to be centralized in one physical location.

Once the data reaches the federated server, the dynamic digital immune system (DDIS), shown as element 104, comes into operation. The DDIS is a critical component of the architecture, designed to continuously monitor and evaluate the integrity of the collected data. This system is tailored to detect poisoned data, corrupted inputs, or low-quality data, which could degrade the accuracy and reliability of the AI model's predictions. The DDIS's ability to dynamically adapt to the incoming data ensures that it responds to potential threats in real-time, flagging suspicious data points for further analysis. This dynamic flagging mechanism is detailed at element 106, where the system identifies and marks data that might have been compromised due to external manipulation or poor quality. Each flagged data point is tracked for further verification, creating a real-time monitoring loop that keeps the system's data flow secure.

The flagged data proceeds to the data quality enhancement phase, represented by element 108, where the system applies sophisticated algorithms to cleanse and refine the data. This phase is crucial because poor data quality is a known factor that can significantly affect AI model performance, leading to incorrect or misleading outputs. The enhancement processes include normalization, validation, and correction of the data to ensure consistency and accuracy before it is used for computation. During this process, an audit trail, denoted by element 110, is maintained to ensure transparency. The audit matrix and associated hash-key are used to track the data lineage, providing a mechanism for verifying the source and the integrity of the data at each step of processing. The hash-key serves as a unique identifier that locks the data to a cryptographic fingerprint, enabling the system to detect any unauthorized alterations.

The system also incorporates dynamic security measures at element 112, where encryption and other security protocols are dynamically applied to sensitive data. These security protocols are adaptive, responding to the sensitivity of the data being processed, and ensuring that the data remains protected from unauthorized access or tampering throughout its lifecycle. As the data moves through the system, irrelevant data is identified and eliminated at element 114. This stage plays a critical role in optimizing the system's computational efficiency by removing data that does not contribute to the AI model's predictions, ensuring that the system processes only relevant and valuable information. This process is followed by the elimination of extra volume, represented by element 116, which further reduces the data burden by removing redundant or excessive data that could otherwise overload the system's computational resources.

At element 118, the system engages in automated data cleaning, where any remaining inconsistencies, noise, or potential errors are automatically detected and corrected. This cleaning process is designed to ensure that the dataset is entirely reliable and ready for use in critical AI computations. The automated nature of this process ensures that the system can handle large volumes of data without manual intervention, which is essential for scaling the system to enterprise-level AI applications. Following the cleaning process, the traceability matrix model, shown as element 120, comes into play. This model tracks the entire lifecycle of the data, recording its origin, every transformation it undergoes, and its current state in the system. This level of traceability provides not only accountability but also the ability to quickly identify the source of any issues that might arise during data processing.

Once the data has been cleaned, enhanced, and validated, it is fed into the aggregation model at element 122. The aggregation model combines multiple data streams into a unified dataset, allowing the AI model to analyze a comprehensive and cohesive body of information. This aggregated data then enters the model matrix computation engine at element 124, where the core AI algorithms perform calculations and predictions based on the input data. The computation engine utilizes a series of macros and mathematical formulas designed to analyze trends, make predictions, and provide explainable outputs, ensuring that the AI's decision-making process remains transparent and accountable.

In tandem with the computation engine, the system deploys swarm AI, depicted at element 126. Swarm AI is an advanced mechanism that leverages multiple intelligent agents to optimize both task distribution and system security. These agents work collaboratively, allowing the system to process large datasets and complex computations efficiently. The agents are also responsible for managing resource allocation, ensuring that the system remains responsive even during periods of high demand. Task distribution, as shown in element 128, plays a critical role in balancing the computational load across multiple servers or nodes, preventing bottlenecks and ensuring that the system performs optimally under varying conditions. Additionally, the security model at element 130 ensures that every component in the system adheres to strict security protocols, guarding against unauthorized access and external threats.

The system's ability to identify corrupted nodes is represented by element 132. This feature continuously monitors the integrity of the computational environment, identifying any nodes that may have been compromised by cyberattacks or system failures. In cases where corruption is detected, the system can isolate or repair the affected nodes to prevent the spread of compromised data. Continuous scanning, as outlined in element 134, further enhances the system's security by monitoring for anomalies or unusual patterns in the Explainable AI matrix macros. This scanning process is crucial for detecting cyberattacks in real-time, particularly those that target the model's decision-making processes.

Hash-key tracking at element 136 ensures the consistency and integrity of data throughout the system. By verifying the hash-key at each stage of processing, the system can quickly detect any discrepancies that suggest tampering or unauthorized manipulation. Element 138 introduces quantum entanglement into the system's anomaly detection framework. The quantum entanglement algorithm is employed to detect variances in the data, utilizing the principles of quantum physics to identify both false positives and false negatives that might otherwise go undetected in traditional AI systems. The detection of these variances, shown in element 140, provides the system with the capability to identify subtle anomalies that could degrade the accuracy of the AI model's outputs.

Once anomalies or variances are detected, the system moves to element 142, where it mitigates poisoned data. This mitigation process involves isolating the corrupted data and preventing it from affecting the final outcomes of the AI model. After the data is cleared of any anomalies, the system works to fortify the reliability of the AI output at element 144. This final reinforcement ensures that the model's predictions are accurate, reliable, and free from the influence of compromised data. The entire process culminates at element 146, where the system detects and mitigates cyber assaults or other malicious activities. This final step ensures that the system remains resilient, protecting the integrity of the AI's decision-making processes against evolving security threats.

Stated differently, in the context of FIG. 1, the system begins with data collection, where diverse datasets are gathered from multiple sources. These sources may include real-time sensors, distributed networks, or batch data streams, ensuring comprehensive coverage of scenarios relevant to Explainable AI applications and potential threats. The diversity of the data allows the system to address a wide array of challenges associated with poisoned data, cyberattacks, and other anomalies that can undermine AI model accuracy. By collecting data from such varied origins, the system ensures that it is not limited to a single data type or source, allowing for a robust and adaptable AI architecture.

The gathered data is then transmitted to a federated server, which plays a crucial role in centralizing data from multiple distributed locations. The federated server architecture ensures that data privacy is maintained even as the system aggregates data from disparate sources. This approach allows for decentralized data handling while still offering centralized processing benefits. The federated nature of the server also means that sensitive or private data does not need to leave its original location, enhancing privacy and security while still enabling efficient AI processing. This structure is especially important for systems handling sensitive information across multiple jurisdictions, where data privacy regulations may vary.

The system's Dynamic Digital Immune System (DDIS) continuously monitors the quality and integrity of the collected data. The DDIS is designed to detect data anomalies, poisoned inputs, and any corruption that might compromise the AI model's output. It adapts dynamically to new threats, meaning that as potential dangers evolve, the system's detection capabilities are upgraded in real-time. This continuous monitoring is essential in an environment where data is constantly changing, ensuring that any threats are mitigated before they can cause significant damage to the AI's decision-making process. The DDIS functions as a guardian for data quality, ensuring that only trustworthy data is passed through to the next stages of the AI pipeline.

As part of the DDIS, the data is subjected to an automatic flagging process. When data is flagged, it indicates potential issues that could compromise the AI model's integrity. This flagging is a crucial step because it allows the system to isolate data that might have been altered by malicious actors or corrupted due to poor data quality. By identifying such data early in the process, the system ensures that it does not inadvertently allow faulty data to influence critical AI decisions. Flagged data is then subjected to further scrutiny, where specialized algorithms and human intervention may determine whether the data can be cleansed and used or should be discarded altogether.

Following the flagging of questionable data, the system enters the data quality enhancement phase. Here, a suite of techniques is applied to improve the overall quality of the data. These techniques include security enhancements, which ensure that sensitive data is encrypted and protected from unauthorized access. Volume elimination is also a key focus at this stage, as the system filters out redundant data that may add unnecessary processing load without contributing to the AI's decision-making. By eliminating excess volume, the system improves its efficiency and ensures that only the most critical data is retained. Additionally, the system filters out irrelevant data, which does not meaningfully contribute to the learning process of the AI model. This not only reduces computational waste but also enhances the model's accuracy by ensuring it is trained and validated on relevant data.

Automated data cleaning processes are employed to remove noise, errors, and inconsistencies from the datasets. Automation is crucial here, given the volume of data the system must handle. Manual cleaning would be inefficient and prone to human error. Instead, the system uses advanced algorithms to detect and correct issues in real-time, ensuring that the data used by the AI model is as clean and reliable as possible. This stage of the process is vital because any errors in the data that go uncorrected could lead to faulty AI predictions, undermining the overall goal of Explainable AI.

The system also incorporates dynamic security measures to protect the data as it moves through the various stages of processing. Dynamic encryption protocols are applied to sensitive data, ensuring that it remains secure at every step of the process. These protocols are adaptive, meaning that they can change based on the sensitivity of the data or the type of processing being performed. This approach ensures that the system is not vulnerable to cyberattacks or unauthorized access, even as the data is manipulated and analyzed.

In addition to enhancing data quality, the system eliminates unnecessary data by filtering out both extra volume and irrelevant information. This ensures that only essential, high-quality data is processed by the AI model. Extra volume, which refers to redundant or unnecessary data, is removed to streamline the processing workload. Similarly, irrelevant data, which does not contribute meaningfully to AI training or decision-making, is identified and discarded. This process is vital for improving the overall performance and accuracy of the AI model, as it reduces the computational load and allows the system to focus on the most important data Once the data has been cleaned and enhanced, it is aggregated into a final dataset that is prepared for AI processing. This aggregation phase consolidates data from multiple sources, ensuring that the dataset is comprehensive and representative of the scenarios the AI model will face. The aggregation model is essential for ensuring that the AI has access to a wide variety of data points, which enhances its ability to make accurate predictions and decisions.

The traceability matrix model tracks the original sources of the data, ensuring transparency and accountability throughout the data's journey through the system. This model records the data's lineage, from its initial collection to its final processing in the computation matrix model. By maintaining a detailed log of each data point's origin and its path through the system, the traceability matrix allows for the quick identification of any issues or anomalies that may arise during the computation process. This ensures that the system can pinpoint the source of any data corruption or manipulation, further enhancing the reliability of the AI outputs.

The computation matrix model processes the aggregated data by applying the necessary macros and computations. This is where the AI's core algorithms perform their analysis, generating predictions and decisions based on the data. The computation matrix model is designed to be both efficient and accurate, ensuring that the AI produces reliable outputs that can be explained and traced back to their data inputs. The system's reliance on well-structured computations ensures that the AI model operates with a high degree of precision, which is critical for maintaining trust in its outputs.

Swarm AI is deployed to manage task distribution within the system. Swarm intelligence enables multiple AI agents to collaborate on data auditing and security tasks, improving the efficiency and speed of the system's data evaluation processes. By distributing tasks among different agents, the system ensures that no single agent is overwhelmed, which enhances the overall performance of the AI model. This collaborative approach also improves the system's ability to audit large datasets in real-time, detecting issues more quickly and efficiently than a single-agent system could.

The system's security model matrix links data directly to its original sources, whether those sources are microservices, third-party APIs, or network resources. This direct connection allows the system to verify the integrity of the data and ensures that any manipulations are detected immediately. By maintaining a clear link between data and its source, the system can quickly identify and rectify any corrupted or weak components within the AI framework.

A continuous scanning model provides real-time monitoring of the system's performance, using quantum entanglement techniques to detect potential cyber threats or anomalies. This model continuously scans for computational variances and other indicators of tampering, providing an additional layer of security. The system can detect "try and escape" events, where attackers manipulate data or computations in an attempt to avoid detection. By continuously scanning for these events, the system can respond quickly to any emerging threats.

Hash-key tracking further enhances the system's security by logging and identifying events associated with potential cyberattacks. Each data point is assigned a hash-key, which serves as a unique identifier for tracking data integrity. If the hash-key is altered, the system can immediately identify the change and respond to the potential threat. This mechanism is crucial for preventing unauthorized modifications to the data and ensuring that the AI model's outputs remain trustworthy.

Quantum entanglement is used to detect anomalies within the computation process. By leveraging the principles of quantum physics, the system can identify even subtle variances in the data, improving the accuracy of its anomaly detection. This advanced detection capability is particularly effective in identifying poisoned data or false inputs that could otherwise go unnoticed. The traceability matrix model assists in identifying gaps in security by auditing "try and escape" events, ensuring that the system remains robust against both internal and external threats.

Finally, the system actively mitigates poisoned data through automated decision-making processes. The Explainable AI framework is designed to recognize and neutralize poisoned data before it can influence the model's outputs. This ensures that the AI's predictions and decisions remain reliable, even when the system is exposed to malicious inputs or attacks. By continually fortifying the system's defenses against poisoned data, the system enhances the overall reliability and trustworthiness of its AI outputs, making it an essential tool in high-stakes environments where AI accuracy is critical.

FIG. 2 presents an intricate flow diagram that meticulously details the process involved in detecting computational variances and ensuring the integrity and security of Explainable AI (XAI) systems. The process begins at element 200, which represents the computational data model responsible for result processing. This data model serves as the foundation for the AI system's decision-making capabilities, where raw data inputs are transformed into actionable outputs through a series of complex computations. The computational data model is designed to manage large datasets and diverse data inputs, ensuring that each piece of data is processed with precision and consistency. The AI system relies heavily on this model to produce results that are not only accurate but also explainable, making it essential that this step be handled with great care. The model serves as the starting point for the entire flow, where data is initially analyzed, structured, and prepared for the intricate computations that will follow.

Following the initial processing within the computational data model, the system applies a quantum entanglement algorithm, which is depicted as element 202. The use of quantum entanglement in this system introduces an advanced layer of anomaly detection that is not typically available in traditional AI systems. Quantum entanglement allows the system to monitor and assess the relationships between data points, even at the most granular level, by leveraging the quantum states of entangled particles. This capability enables the system to detect extremely subtle variances or deviations within the data that might otherwise go unnoticed. The quantum entanglement algorithm serves to enhance the robustness of the AI model by identifying discrepancies in data patterns or computational outputs that could signal potential errors, manipulated data, or cyberattacks. It is through this process that the system can maintain a high level of accuracy, ensuring that no irregularities are missed.

As part of this process, the system moves to monitor the computational model, shown as element 204. Continuous monitoring is crucial in maintaining the stability and reliability of the system, as it ensures that all computations are proceeding as expected and that any variances are immediately detected and addressed. The system is designed to monitor each computational step meticulously, checking for any signs of anomalies or errors that could disrupt the AI model's performance. By constantly overseeing the computational environment, the system ensures that any deviations from expected behavior are caught early in the process, allowing for rapid response and mitigation. This level of monitoring is particularly important in high-stakes applications, where even the smallest error could have significant consequences.

At this stage, the system checks the QBIT value, represented by element 206, which is a critical part of maintaining the integrity of quantum computations. The QBIT value represents the quantum state information that the system uses to verify the accuracy of its quantum computations. By checking the QBIT value, the system ensures that the quantum entanglement process remains consistent and that no irregularities have occurred during the computational process. This step is essential for preserving the accuracy of the AI model's outputs, as any deviations in the QBIT value could signal that an error or manipulation has occurred.

Simultaneously, the system verifies the hash-key value at element 207. The hash-key serves as a cryptographic fingerprint for the data being processed, ensuring that any changes or manipulations can be immediately detected. By comparing the current hash-key with the expected value, the system can determine whether the data has remained unaltered throughout the computational process. This verification step is crucial for identifying cyberattacks or any unauthorized modifications that might have occurred during data processing. The hash-key tracking mechanism ensures that the integrity of the data is preserved, providing an additional layer of security against external threats.

Once the hash-key and QBIT values have been verified, the system proceeds to validate the data at element 208. Data validation is a critical process that ensures all inputs and computations align with the expected outcomes. The system thoroughly checks the consistency and accuracy of the data, verifying that no errors or anomalies have been introduced during the processing stages. This validation step is vital for maintaining the overall reliability of the AI system, as it ensures that only clean, accurate data is used to generate the final results. If any discrepancies are detected during this step, the system can take immediate corrective actions to address the issue before it impacts the AI model's decision-making process.

At element 210, the traceability matrix model comes into play, providing a detailed record of the data's lifecycle throughout the entire process. The traceability matrix tracks each data point from its origin, through every transformation it undergoes, to its final state in the AI model's computations. This level of traceability ensures that the system can quickly identify the source of any errors or anomalies, allowing for rapid diagnosis and correction. The traceability matrix is particularly important for maintaining transparency and accountability in the AI system, as it allows for a clear audit trail of every step taken during the data processing and decision-making process. This feature is especially valuable in environments where regulatory compliance and data governance are critical, as it ensures that all data can be traced back to its original source.

At element 212, the system actively identifies any differences or manipulations in the data. This step involves a thorough analysis of the data to detect any unauthorized changes or anomalies that may have occurred during the computational process. By identifying such manipulations, the system can flag suspicious activity and take immediate action to protect the integrity of the AI model. This detection capability is crucial for maintaining the security of the system, as it ensures that any attempts to tamper with the data are quickly identified and addressed before they can cause harm.

The system also detects computational variances, represented by element 214. Computational variances can occur due to errors in the input data, discrepancies in the computational logic, or external manipulations. The system is designed to catch even the smallest variances, which could otherwise lead to incorrect or misleading AI outputs. Detecting these variances early allows the system to mitigate any negative effects on the AI model's predictions, ensuring that the outputs remain accurate and reliable. This step is particularly important in environments where precision is critical, such as financial modeling, diagnostics, or autonomous systems.

At element 216, the system audits "try and escape" events, where attackers may attempt to modify the computational process in a way that avoids detection. In these scenarios, attackers may try to manipulate the computations while keeping the final output unchanged, making it difficult to detect the attack. The system's audit mechanism ensures that these events are logged and thoroughly investigated, preventing attackers from bypassing the system's security protocols. By auditing these events, the system can ensure that any manipulations are caught and addressed before they have a chance to impact the AI model's outputs.

If no anomalies or manipulations are detected, the system continues the process uninterrupted, as indicated by element 218. However, if any modifications or suspicious activity are identified, the system generates a report to the administrator, shown at element 220. This report provides detailed information about the anomaly, allowing administrators to take appropriate action to resolve the issue. The system's ability to generate real-time reports ensures that potential threats are addressed promptly, minimizing the risk of damage to the AI model or its outputs.

In cases where a significant anomaly is detected, the system may initiate a rollback or self-healing process, depicted by element 222. The rollback function allows the system to revert to a previous state before the anomaly occurred, effectively undoing any changes that could have compromised the AI model's decision-making process. This self-healing capability is essential for maintaining system stability, as it ensures that the AI model continues to operate reliably even in the face of potential threats or errors.

If the system determines that an anomaly or manipulation is too severe to be corrected, it may stop result generation and processing altogether, as indicated by element 224. This final safeguard prevents the AI model from generating any outputs based on corrupted data, ensuring that no harmful or incorrect decisions are made. By halting the process, the system can protect the overall integrity of the AI model, preventing any erroneous outputs from being propagated.

Throughout the entire flow, the generation of XAI results is continuously monitored, represented by element 205. This ensures that all outputs generated by the AI model are accurate, explainable, and traceable back to their original data inputs. The system's comprehensive security and integrity checks, including quantum entanglement, hash-key tracking, and data validation, ensure that the AI's decisions are both reliable and transparent.

FIG. 3 provides an intricate depiction of the process involved in utilizing AI swarm intelligence for the purpose of task distribution and security in an Explainable AI (XAI) system. The process starts at element 300, where the problem to be solved is clearly defined. This is a crucial first step, as it sets the foundation for the entire swarm intelligence operation. In this phase, the system identifies the specific challenges it aims to address, whether they relate to enhancing data integrity, detecting anomalies, or ensuring security throughout the task distribution process. The importance of a well-defined problem cannot be understated, as it guides the swarm's collective efforts and ensures that each agent is aligned in working towards a common goal.

Once the problem is defined, the system moves to element 302, where it analyzes the environment to identify any potential threats or factors that may influence the swarm's performance. This environmental analysis is comprehensive, taking into account both internal and external variables that could affect the system. The goal is to anticipate challenges, such as cyberattacks, data inconsistencies, or resource limitations, which could compromise the swarm's effectiveness. This analysis equips the swarm with contextual awareness, enabling it to make informed decisions as it navigates its tasks. By understanding the environment, the system is better positioned to proactively counteract threats and optimize its strategies for task distribution.

The next phase, depicted by element 304, involves the development of specialized swarm algorithms. These algorithms are the backbone of the swarm intelligence system, dictating how tasks are assigned, how agents collaborate, and how problems are solved in a decentralized manner. The algorithms are designed with adaptability in mind, allowing the swarm to adjust dynamically to changing conditions, such as shifts in data flow, anomalies detected, or fluctuations in system load. The algorithms ensure that tasks are distributed efficiently, preventing any one agent from becoming overwhelmed while maximizing the overall productivity of the swarm. Additionally, the algorithms facilitate collaboration among agents, allowing them to share insights and resources in real time.

As the system progresses, element 306 illustrates the implementation of communication protocols between the agents in the swarm. Effective communication is essential for ensuring that all agents remain synchronized and can exchange information as needed. These protocols enable the swarm to operate as a cohesive unit, even though the agents are distributed across the network. Communication ensures that agents can request assistance, share findings about anomalies or threats, and update each other on the progress of assigned tasks. The robustness of these communication protocols is critical to the system's overall success, as any breakdown in communication could lead to inefficiencies, delays, or errors in task execution.

Continuous monitoring, represented by element 308, plays a pivotal role in maintaining the swarm's performance. The system constantly tracks the activities of each agent, evaluating their performance in real time. This monitoring allows the swarm to adapt dynamically, reallocating tasks to more capable agents if performance issues arise. For example, if an agent encounters difficulties due to high system load or resource constraints, the system can immediately shift tasks to another agent that is better equipped to handle the workload. This adaptability ensures that the swarm operates smoothly, even in challenging conditions, and maintains its ability to complete tasks efficiently and accurately.

Element 310 focuses on the risk evaluation process, where the system assesses the potential risks associated with each task assignment. This evaluation is necessary to determine which tasks require immediate attention and which can be handled with lower priority. Tasks that are deemed high-risk, such as those related to anomaly detection or security breaches, are prioritized and may involve redundancy, where multiple agents collaborate to ensure accuracy. Lower-risk tasks are still addressed, but with a more streamlined approach, allowing the system to allocate its resources effectively.

Redundancy in task execution, as highlighted by element 312, is a key feature of the swarm intelligence system. To enhance reliability, the system often assigns critical tasks to multiple agents, ensuring that even if one agent fails, another can continue the work without disruption. This redundancy serves as a safeguard, preventing errors or failures from compromising the entire system. It also allows the swarm to cross-validate its findings, where agents verify each other's work to ensure accuracy. In cases where agents detect anomalies or discrepancies in the data, the system can take immediate corrective actions based on the collective input from multiple agents.

The feedback mechanism, represented by element 314, is essential for the continuous improvement of the swarm intelligence system. As agents complete tasks and interact with one another, the system gathers feedback on performance, task efficiency, and error rates. This feedback is then used to refine the swarm algorithms, making the system more efficient over time. By learning from past experiences, the swarm becomes better equipped to handle future challenges, improving its ability to detect and respond to anomalies and security threats. This feedback loop is integral to the system's ability to evolve and maintain high levels of performance in dynamic environments.

The process of testing the swarm intelligence system is shown in element 316, where the system is subjected to various stress tests and scenarios to evaluate its resilience and effectiveness. These tests simulate different operational conditions, such as increased data loads, the introduction of complex security threats, or the failure of key agents. The goal of this testing phase is to ensure that the swarm intelligence system can handle a wide range of challenges while maintaining optimal performance. By identifying potential weaknesses or inefficiencies during testing, the system can make adjustments before being deployed in a live environment.

Once the system has passed all tests, it moves to deployment, as depicted by element 318. In this phase, the swarm intelligence system is activated, and the agents begin to carry out their tasks in real time. The system continuously monitors agent performance, adjusts task allocations as needed, and remains vigilant for any emerging threats or anomalies. During deployment, the system operates dynamically, adapting to the environment and ensuring that tasks are completed efficiently and securely. The agents work collaboratively to monitor data integrity, detect potential anomalies, and execute security protocols, all while maintaining communication with one another to ensure seamless operation.

Thus, FIG. 3 provides a detailed representation of how AI swarm intelligence can be used to effectively manage task distribution and security in the XAI systems disclosed herein. The diagram highlights the importance of problem definition, environmental analysis, algorithm development, and real-time communication among agents. By leveraging the collective power of decentralized agents, the system ensures that tasks are completed accurately, even in the face of evolving threats and complex challenges. The adaptive nature of the system, combined with continuous monitoring, feedback, and redundancy, allows it to maintain high levels of performance and security in dynamic environments. The integration of these elements results in a robust, resilient system that can scale efficiently and respond proactively to changes in the operational landscape.

FIG. 4 provides a detailed system diagram of the Explainable AI Enhancement System (400), illustrating the various modules that work together to enhance the integrity, security, and performance of AI models. The diagram begins with the data collection module (410), which is responsible for receiving data from distributed sources. This module continuously monitors and aggregates data in real time, ensuring that the data flow is both comprehensive and up to date. The data collection module plays a crucial role in ensuring that the system has a diverse dataset to work with, covering different scenarios and potential anomalies that may arise. It ensures the smooth intake of data from decentralized nodes, while also maintaining data privacy and security during transmission, which is critical in federated learning environments.

The anomaly detection module (412) is depicted as the next major component in the system. This module is designed to dynamically detect and flag corrupted, poisoned, or low-quality data by utilizing advanced anomaly detection algorithms. It classifies flagged data into different categories, such as irrelevant data, low-quality data, and data poisoning, and adjusts detection thresholds in real-time based on incoming data volume and quality. By flagging problematic data early in the process, the anomaly detection module enhances the system's ability to identify potential security threats and inconsistencies before they impact the AI model's performance. The module is also equipped with machine learning algorithms to continuously improve its detection capabilities, making it more precise as it learns from historical data patterns. This allows the system to initiate tailored remediation actions based on the specific type of anomaly detected, ensuring a proactive approach to maintaining data integrity.

Once the data is flagged, it moves to the automated data cleaning module (414), which is responsible for improving the overall quality of the AI model inputs. This module focuses on removing redundant or irrelevant data, applying statistical filtering techniques to eliminate noise and inconsistencies, and assessing the relevance of each data point based on predefined criteria. The goal of the automated data cleaning module is to ensure that only high-quality, relevant data is passed on to the AI model for computation, which increases both the accuracy and efficiency of AI predictions. By streamlining the dataset and removing unnecessary data, this module plays a vital role in optimizing the system's performance and preventing any negative impacts on the AI model caused by data inconsistencies.

Another critical component of the system is the dynamic encryption module (408), which safeguards the privacy and security of sensitive data as it moves through the system. This module applies adaptive encryption protocols in real time, adjusting the encryption level based on the sensitivity of the data and the context of its use. The encryption policies are flexible and dynamic, ensuring that the most sensitive data receives the highest level of protection. The module also includes encryption key management capabilities, which involve periodically rotating and updating encryption keys to further enhance data security. In addition, it supports secure key exchange protocols, ensuring that encryption keys are only shared with authorized entities involved in the federated learning process. This combination of features ensures robust protection against data tampering and unauthorized access.

The traceability matrix module (404) is responsible for tracking the complete lifecycle of each data point, from its origin to its final inclusion in the AI model's computations. It logs every transformation the data undergoes, ensuring full transparency and accountability. The traceability matrix also provides a visualization interface that allows system administrators to review the processing history of any data point, making it easy to identify the source of any anomalies or errors. This module is particularly valuable for regulatory compliance, as it integrates with external auditing systems and can generate detailed reports on data integrity and governance. By maintaining a comprehensive log of data origin and transformations, this module enables quick identification and resolution of data integrity issues.

The task distribution module (406) leverages swarm intelligence to optimize the assignment of data auditing and validation tasks across a decentralized network of agents. Each agent is assigned specific responsibilities based on its availability and performance, ensuring that tasks are distributed efficiently across the system. The module continuously monitors agent performance and dynamically reallocates tasks to maintain balance and avoid bottlenecks in the system. The adaptive framework implemented by this module ensures that the system can scale effectively and handle large volumes of data without compromising efficiency.

The final component in FIG. 4 is the self-healing module (402), which is designed to automatically correct anomalies detected during data processing. This module performs real-time corrective actions, including recalculating erroneous data, discarding compromised data, or restoring the system to a previously validated state. The self-healing module includes a rollback function, allowing the system to revert to a prior safe state if irreparable anomalies are detected. Additionally, it incorporates predictive analytics to anticipate potential data integrity issues before they occur, enabling preemptive corrective actions. The module also logs all detected anomalies and corrective actions, notifying system administrators and providing detailed reports on the resolution of data integrity issues.

Overall, FIG. 4 showcases a highly interconnected system where each module plays a critical role in ensuring the accuracy, security, and reliability of the AI model. The system operates dynamically and continuously, integrating real-time monitoring, anomaly detection, data cleaning, encryption, and task distribution, all of which work together to preserve data integrity and improve the performance of Explainable AI systems. The seamless interaction between these modules ensures that the system can efficiently handle large volumes of data, respond proactively to emerging threats, and maintain compliance with data governance regulations.

FIG. 5 illustrates a comprehensive system diagram designed for detecting and mitigating accuracy downgrades in Explainable AI (XAI) systems, leveraging quantum entanglement and model-matrix frameworks. At the core of this system is the data input module (500), which receives data matrices from distributed sources and transmits them securely to other modules for processing. This module plays a critical role in maintaining data integrity, as it includes authentication protocols to verify the authenticity of the data sources before transmitting the data. The secure transmission process ensures that no corrupted or unauthorized data enters the system, thereby preserving the quality of data feeding into the AI models.

Once the data is received, the quantum entanglement anomaly detection module (514) is responsible for applying quantum principles to monitor the relationships between data points in the model-matrix framework. This module continuously tracks the entangled states of the data, ensuring that deviations from expected entanglement patterns are detected and flagged as anomalies. By doing so, the system can identify subtle discrepancies that may indicate data poisoning, corruption, or manipulation. This module refines its detection algorithms over time, updating thresholds dynamically based on feedback from previous anomaly detections, making it increasingly adept at identifying anomalies that could affect the AI model's accuracy.

Parallel to this, the hash key tracking module (502) generates unique hash keys for each computational step and data input, which serve as cryptographic fingerprints ensuring the integrity of the data. This module verifies that the input data and computational processes have not been tampered with, triggering alerts if any discrepancies are detected. The hash key tracking module also incorporates encryption capabilities, securing the hash keys during transmission and storage to prevent unauthorized access. This layer of security is critical in protecting the integrity of the data throughout its lifecycle in the system, ensuring that any alterations or cyberattacks can be immediately detected and mitigated.

The continuous scanning module (504) plays a vital role in real-time monitoring of the data matrix and AI computations. It performs ongoing scans to identify any potential accuracy downgrades or anomalies, cross-referencing its analysis with the results of the quantum entanglement and hash key tracking modules. The continuous scanning module prioritizes detected anomalies based on their severity and the potential impact on AI model performance, triggering immediate corrective actions for high-priority issues. The module also incorporates predictive scanning capabilities, using historical data to anticipate and preemptively address emerging vulnerabilities before they can manifest as critical errors.

The traceability matrix module (508) ensures complete transparency and accountability by logging the entire data lineage, tracking every transformation and computational step that data undergoes within the system. This module allows for real-time visualization of data processing, enabling administrators to trace any anomalies back to their source and identify where potential compromises may have occurred. The traceability matrix also generates compliance reports, ensuring that the system adheres to regulatory standards for data governance and integrity. This feature is particularly valuable in environments where data provenance and auditability are crucial for maintaining trust and compliance with industry regulations.

The AI swarm intelligence module (510) coordinates task distribution across a decentralized network of agents, optimizing the validation and auditing of anomalies detected throughout the system. Each agent is responsible for validating flagged data points, cross-referencing findings with other agents to ensure consensus and accuracy. This module also manages redundancy, ensuring that multiple agents are assigned to critical tasks to prevent single points of failure. By leveraging the collective intelligence of multiple agents, the system enhances its ability to detect and respond to anomalies in real-time, improving the robustness of the AI model's performance.

Finally, the self-healing module (506) is designed to automatically correct detected anomalies, ensuring that the system maintains its operational integrity without manual intervention. This module can recalibrate or rollback the system to a previously validated state if the anomaly cannot be corrected immediately. The self-healing module also logs all corrective actions taken, providing system administrators with a comprehensive record of how each anomaly was resolved. This ensures that any recurring issues can be addressed more effectively in the future, contributing to the continuous improvement of the system's reliability and resilience.

Thus, FIG. 5 demonstrates a multi-layered approach to enhancing data integrity, anomaly detection, and system resilience within an XAI framework. By integrating quantum entanglement principles, real-time scanning, traceability, decentralized task distribution, and self-healing mechanisms, the system is capable of detecting and mitigating accuracy downgrades caused by data corruption, manipulation, or computational anomalies. Each module operates in concert to ensure that the AI model remains accurate, transparent, and secure, even in the face of evolving threats and challenges. This dynamic system not only preserves data integrity but also provides administrators with the tools to trace, validate, and correct anomalies efficiently, ensuring long-term system reliability and trustworthiness.

FIG. 6 provides a comprehensive system diagram illustrating the architecture for detecting and mitigating accuracy loss in Explainable AI (XAI) systems using quantum entanglement and model-matrix frameworks. The central component of the system is the data ingestion module (612), which serves as the entry point for data into the system. This module is responsible for receiving data matrices from distributed sources, ensuring that the authenticity of the incoming data is verified through secure communication protocols. To further enhance data integrity, the module applies cryptographic hashing techniques to each data point, ensuring that the data has not been tampered with during transmission. Additionally, the data ingestion module scans incoming data for potential irregularities and implements real-time anomaly detection mechanisms to identify corrupted or compromised data at the earliest stage of processing.

The quantum entanglement anomaly detection module (614) is a key feature of the system, applying quantum principles to analyze the relationships between data points within the model-matrix. This module continuously monitors the entangled states of data points, using a multi-layered entanglement tracking system to detect deviations from expected patterns. These deviations signal anomalies, such as data poisoning or manipulation, which could degrade the accuracy of the AI model. To ensure precision, the anomaly detection module dynamically adjusts its detection thresholds based on the incoming data volume and quality, making it more sensitive to subtle variations over time. It integrates machine learning techniques to improve its detection capabilities by learning from historical data and past anomaly patterns, making the system more resilient to emerging threats. Flagged data points are then isolated for further analysis, ensuring that compromised data is not propagated into the system's computational processes.

In parallel, the hash key tracking module (602) plays a crucial role in maintaining the integrity of data throughout the system's lifecycle. This module generates unique hash keys for each data point and computation step, verifying that the data and processes have not been altered. If any discrepancies are detected during this verification process, the module triggers automated alerts to notify system administrators of potential issues. The hash key tracking module also incorporates an encryption sub-module that dynamically rotates encryption keys to safeguard the hash keys during both transmission and storage. This ensures that even if an attacker attempts to intercept the hash keys, they are rendered unusable without the correct decryption key. In addition, the module provides a comprehensive audit trail, logging all hash key generation and verification events, making it easier for administrators to trace the integrity of the data and computations.

The continuous scanning module (604) ensures that the system remains vigilant by continuously monitoring the computation process for anomalies. This module cross-references the results of the quantum entanglement anomaly detection and hash key tracking modules to detect any inconsistencies in the data. It incorporates an anomaly prioritization engine, which categorizes anomalies based on their severity and the potential impact they may have on the AI model's performance. High-priority anomalies trigger immediate corrective actions, while lower-priority issues are queued for background analysis. This module also applies predictive analytics to anticipate potential vulnerabilities in the system based on historical anomaly patterns, allowing the system to preemptively address potential threats before they manifest.

The traceability matrix module (608) is responsible for tracking the lineage of each data point throughout the system, maintaining a detailed record of every transformation and computational step. This module provides real-time visualization of the data's journey, enabling administrators to trace anomalies back to their source and assess the root cause of any issues. Additionally, the traceability matrix integrates with external compliance platforms to ensure that the system adheres to regulatory standards for data governance. The module highlights areas of the data flow where anomalies have been detected and supports real-time auditing, allowing administrators to conduct detailed investigations into any data integrity issues. It also offers customizable reporting features, ensuring that the system can generate audit reports tailored to specific compliance requirements.

Task distribution is handled by the AI swarm intelligence module (610), which assigns data auditing and validation tasks to a network of decentralized agents. This module optimizes task allocation based on system load and agent performance, ensuring that resources are used efficiently. The agents collaborate in real-time to cross-validate the flagged anomalies, using redundancy management to ensure that critical tasks are assigned to multiple agents for verification. This collaborative approach allows the system to distribute its computational load across multiple agents, improving both efficiency and accuracy in detecting and resolving data integrity issues.

At the core of the system's resilience is the self-healing module (606), which performs real-time corrective actions to address detected anomalies. This module can recalibrate the system, discard corrupted data, or restore the system to a previously validated state if necessary. The self-healing module includes a rollback sub-module, which allows the system to revert to a safe state in the event that an anomaly cannot be immediately resolved. It also integrates with external backup systems, ensuring that the system can recover data and processes in the event of a critical failure. This module continuously learns from its corrective actions, improving its ability to handle future anomalies, and generates detailed logs and alerts to keep system administrators informed of any issues and the actions taken to resolve them.

Overall, FIG. 6 showcases a robust system for detecting and mitigating accuracy loss in XAI systems, leveraging quantum entanglement, real-time scanning, traceability, and self-healing capabilities. Each module plays a vital role in ensuring data integrity, computational accuracy, and system resilience, providing a comprehensive framework for maintaining the reliability of AI models in dynamic and potentially hostile environments.

Pseudocode exemplars for implementing various aspects of this disclosure are set forth below with explanations for reference.

```python
Pseudocode for Core Modules:
'''python
# Data Collection Module
class DataCollectionModule:
    def __init__(self):
        self.data = [ ]
        self.sources = [ ]
    def receive_data(self, data, source):
        """
        Receives data from various distributed sources.
        Tracks the source of data for transparency and validation.
        """
        if self.validate_source(source):
            self.data.append(data)
            self.sources.append(source)
            self.monitor_and_aggregate( )
        else:
            print(f"Data from unverified source {source} rejected.")
    def validate_source(self, source):
        """
        Validates the authenticity of the data source.
        Implements secure communication protocols to verify source integrity.
        """
        # Check if source is in the approved list of nodes
        return source in approved_sources
    def monitor_and_aggregate(self):
        """
        Monitors incoming data for volume, type, and potential anomalies.
        Aggregates data from multiple distributed sources for further processing.
        """
        # Monitor incoming data for quality assurance
        print(f"Aggregating data from {len(self.sources)} sources.")
# Anomaly Detection Module
class AnomalyDetectionModule:
    def __init__(self):
        self.anomalies = [ ]
        self.detection_threshold = 0.95 # Initial anomaly detection threshold
    def flag_corrupted_data(self, data):
        """
        Flags data as corrupted if it contains anomalies based on pre-trained machine
learning models.
        Uses dynamic anomaly detection algorithms to catch irregularities in real-time.
        """
        if self.detect_anomaly(data):
            self.anomalies.append(data)
            print("Anomaly detected and flagged.")
            return True
        return False
    def detect_anomaly(self, data):
        """
        Detects anomalies using a machine learning-based model that identifies outliers.
        The model continuously learns from historical data and feedback to improve
detection accuracy.
        """
        # Run anomaly detection model, return True if anomaly is found
        anomaly_score = anomaly_detection_algorithm(data)
        return anomaly_score < self.detection_threshold
    def classify_flagged_data(self, data):
        """
        Classifies flagged data into categories such as poisoned data, irrelevant data, or
computational errors.
        Each classification triggers a specific response mechanism.
        """
```

-continued

```
        category = classify_anomaly(data)
        print(f"Data classified as {category}.")

return category
    def adjust_thresholds(self, new_threshold):
        """
        Adjusts the detection thresholds dynamically based on the volume and type of
incoming data.
        As data patterns evolve, the system adapts to minimize false positives and false
negatives.
        """
        self.detection_threshold = new_threshold
        print(f"Detection threshold adjusted to {self.detection_threshold}.")
# Automated Data Cleaning Module
class DataCleaningModule:
    def __init__(self):
        self.cleaning_strategies = ["redundancy_elimination", "statistical_filtering"]
    def remove_redundant_data(self, data):
        """
        Identifies and removes redundant or duplicate data entries.
        This process optimizes the dataset by ensuring only unique, relevant data is
passed forward.
        """
        cleaned_data = filter_duplicates(data)
        print("Redundant data removed.")
        return cleaned_data
    def apply_statistical_filtering(self, data):
        """
        Applies statistical techniques to remove noise and improve the signal-to-noise
ratio.
        These techniques include outlier detection and smoothing algorithms.
        """
        filtered_data = filter_noise(data)
        print("Statistical filtering applied to data.")
        return filtered_data
    def assess_relevance(self, data):
        """
        Evaluates the relevance of data by comparing it to predefined criteria.
        Irrelevant data is discarded to ensure the AI model processes only useful inputs.
        """
        relevant_data = relevance_check(data)
        print("Relevance of data assessed.")
        return relevant_data
# Dynamic Encryption Module
class DynamicEncryptionModule:
    def __init__(self):
        self.encryption_keys = { }
    def apply_encryption(self, data, sensitivity_level):
        """
        Encrypts sensitive data using multi-layer encryption techniques.
        Encryption strength is dynamically adjusted based on the sensitivity of the data.
        """
        encrypted_data = encrypt_data(data, sensitivity_level)
        self.manage_encryption_keys( )
        print(f"Data encrypted with sensitivity level {sensitivity_level}.")
        return encrypted_data
    def manage_encryption_keys(self):
        """
        Rotates encryption keys dynamically based on usage and security policies.
        Keys are automatically managed to prevent vulnerabilities due to outdated
encryption.
        """
        # Logic to rotate and manage encryption keys securely
        print("Encryption keys rotated and managed.")
# Traceability Matrix Module
class TraceabilityMatrixModule:
    def __init__(self):
        self.data_lifecycle = { }
    def track_data_origin(self, data, source):
        """
        Tracks the origin of each data point to maintain full transparency of the data
lifecycle.
        This process ensures that each piece of data can be traced back to its original
source.
        """
        self.data_lifecycle[data] = {"source": source}
        print(f"Data origin from {source} tracked.")
    def log_data_lifecycle(self, data, transformation):
        """
        Logs every transformation that a piece of data undergoes throughout its lifecycle.
```

-continued

---

```
    This helps in ensuring the integrity of the AI model and identifying corrupted
nodes.
    """
        if data in self.data_lifecycle:
            self.data_lifecycle[data]["transformation"] = transformation
        else:
            print("Data origin not found for logging lifecycle.")
        print(f"Data lifecycle logged for transformation: {transformation}.")
    def visualize_processing_history(self):
        """
        Provides a visualization of the data's lifecycle, showing every stage of processing.
        This helps administrators audit the entire data pipeline.
        """
        # Logic to generate real-time data processing history visualization
        print("Data lifecycle visualization generated.")
# Task Distribution Module using Swarm Intelligence
class TaskDistributionModule:
    def __init__(self):
        self.tasks = { }
        self.agents = [ ]
    def implement_swarm_intelligence(self, tasks, agents):
        """
        Distributes tasks across multiple agents using a decentralized swarm intelligence
model.
        This approach allows for parallel processing of tasks, increasing system efficiency.
        """
        self.tasks = tasks
        self.agents = agents
        self.optimize_task_assignment( )
        print("Swarm intelligence implemented for task distribution.")
    def optimize_task_assignment(self):
        """
        Dynamically reallocates tasks based on agent performance and availability.
        This ensures that no agent is overburdened, and tasks are completed efficiently.
        """
        # Logic to dynamically reallocate tasks based on real-time agent performance
        print("Task assignment optimized.")
    def monitor_agent_performance(self, agent):
        """
        Monitors the performance of each agent in real time.
        If an agent underperforms, its tasks are redistributed to other agents.
        """
        # Real-time performance monitoring logic
        print(f"Agent {agent} performance monitored.")
# Self-Healing Module
class SelfHealingModule:
    def __init__(self):
        self.corrective_actions_log = [ ]
    def correct_anomalies(self, anomalies):
        """
        Automatically corrects anomalies detected in the data pipeline.
        Depending on the severity, it either fixes the anomaly or rolls back to a previous
valid state.
        """
        for anomaly in anomalies:
            if self.is_severe_anomaly(anomaly):
                self.rollback(anomaly)
            else:
                self.fix_anomaly(anomaly)
        print("Anomalies corrected.")
    def rollback(self, anomaly):
        """
        Rolls back the system to a previously validated state when severe anomalies are
detected.
        Prevents propagation of corrupted data in the AI model.
        """
        # Rollback logic based on anomaly severity
        print(f"Rolled back system to a previous state due to anomaly: {anomaly}.")
    def fix_anomaly(self, anomaly):
        """
        Applies corrective measures to resolve minor anomalies.
        Ensures the data pipeline remains intact and operational.
        """
        # Logic to apply a fix to the anomaly
        print(f"Fixed anomaly: {anomaly}.")
    def perform_predictive_analytics(self):
        """
        Uses predictive analytics to anticipate future anomalies based on historical
patterns.
```

-continued

```
    Helps in preemptively addressing potential threats before they impact the
system.
        """

# Predictive analytics to foresee potential issues in the data pipeline
        print("Predictive analytics performed to anticipate anomalies.")
# Main System Controller
class ExplainableAISystem:
    def __init__(self):
        self.data_collection = DataCollectionModule( )
        self.anomaly_detection = AnomalyDetectionModule( )
        self.data_cleaning = DataCleaningModule( )
        self.encryption = DynamicEncryptionModule( )
        self.traceability = TraceabilityMatrixModule( )
        self.task_distribution = TaskDistributionModule( )
        self.self_healing = SelfHealingModule( )
    def process_data(self, data, source):
        """

The core function that processes incoming data through the Explainable AI
system.
    It orchestrates the interaction of all modules to ensure secure, reliable, and
accurate AI outputs.
        """

self.data_collection.receive_data(data, source)
        if self.anomaly_detection.flag_corrupted_data(data):
            cleaned_data = self.data_cleaning.remove_redundant_data(data)
            cleaned_data = self.data_cleaning.apply_statistical_filtering(cleaned_data)
            relevant_data = self.data_cleaning.assess_relevance(cleaned_data)
            encrypted_data = self.encryption.apply_encryption(relevant_data,
sensitivity_level="high")
            self.traceability
.track_data_origin(encrypted_data, source)
            self.traceability.log_data_lifecycle(encrypted_data,
transformation="encryption")
        self.task_distribution.implement_swarm_intelligence(self.task_distribution.tasks,
self.task_distribution.agents)
            self.self_healing.correct_anomalies(self.anomaly_detection.anomalies)
        else:
            print("No anomalies detected; processing continues normally.")
    '''
```

The following provides a detailed explanation of the code.

a. Data Collection Module: This module not only receives data but validates its origin using secure communication protocols. Data authenticity is ensured before it's processed. The module continuously monitors data from distributed sources and aggregates it into a single pipeline for further analysis. Each source is logged, allowing traceability and accountability.

b. Anomaly Detection Module: This module applies machine learning algorithms to detect anomalies in real-time, with dynamic threshold adjustment. The detection model improves over time by learning from previously flagged data and feedback loops. Data is classified into specific categories, such as poisoned or irrelevant, each triggering appropriate responses (e.g., discarding or cleaning the data). Thresholds for detection are adjusted dynamically to adapt to evolving data conditions.

c. Automated Data Cleaning Module: Once data is flagged as anomalous, this module eliminates duplicates and applies statistical filtering to remove noise and enhance the relevance of the dataset. It ensures that the AI model only processes meaningful, high-quality data, optimizing performance and accuracy.

d. Dynamic Encryption Module: Sensitive data is encrypted dynamically, with encryption strength varying based on the sensitivity level. The encryption keys are rotated frequently to ensure data privacy and prevent unauthorized access, while managing the security policies that govern key rotation.

e. Traceability Matrix Module: This module tracks the complete lifecycle of data, from its origin to its final state in the AI model. By logging every transformation, the module provides transparency and ensures that every piece of data can be traced back to its source. It generates real-time visualizations of the data flow for administrators to audit.

f. Task Distribution Module (Swarm Intelligence): This module optimizes task distribution using swarm intelligence, ensuring that tasks are efficiently allocated across multiple agents. It dynamically reallocates tasks based on real-time agent performance, preventing bottlenecks and maximizing processing speed. It also monitors agent performance to ensure tasks are completed effectively.

g. Self-Healing Module: The self-healing process automatically corrects detected anomalies. If the anomaly is critical, the system rolls back to a previously validated state, ensuring the AI model continues to function correctly without corrupted data. Additionally, predictive analytics help anticipate future anomalies, allowing the system to take preventive action.

h. Main System Controller: The controller orchestrates all the modules, starting with data collection, anomaly detection, data cleaning, encryption, and task distribution. It ensures anomalies are corrected automatically, logs data transformations, and continuously monitors the AI system's health to maintain reliability and security.

A skilled artisan, upon reviewing the disclosure, will appreciate that there are numerous alternatives, modifications, combinations, and customizations that can be made to the systems and methods described herein.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A system for enhancing data integrity and quality assurance in Explainable AI (XAI) systems, comprising:

a data collection module configured to receive data from a plurality of distributed sources during federated training processes, the data collection module further configured to continuously monitor and aggregate incoming data in real time, wherein the data is collected from decentralized nodes and sources while ensuring privacy and data security during transmission;

an anomaly detection module configured to dynamically detect and flag corrupted, poisoned, irrelevant, or low-quality data using advanced anomaly detection algorithms, wherein the anomaly detection module evaluates patterns, inconsistencies, and deviations within the incoming data, and generates flags for any data that fails to meet predefined quality thresholds, further ensuring early identification of potential security threats or data inaccuracies;

an automated data cleaning module configured to remove redundant, irrelevant, erroneous, or unnecessary data from the flagged data, wherein the data cleaning module performs multiple processes including volume reduction, noise elimination, and data filtering to ensure that only high-quality, relevant data is processed by the AI system, thereby improving both efficiency and accuracy of AI model computations by reducing noise and improving data consistency;

a dynamic encryption module configured to apply adaptive encryption protocols to sensitive data in real time, wherein the encryption protocols dynamically adjust based on sensitivity level of the data and context in which the data is being processed, ensuring robust protection against unauthorized access, data tampering, and external cyberattacks, thereby safeguarding the integrity and confidentiality of the data throughout the federated learning and processing stages;

a traceability matrix module configured to track and maintain a comprehensive record of origin, lineage, and processing history of each data point received by the system, wherein the traceability matrix enables the tracking of data transformations, from the source to final computation, ensuring transparency, accountability, and enabling quick identification and isolation of data anomalies or compromised data points;

a task distribution module configured to implement swarm intelligence algorithms to distribute data auditing and validation tasks across a network of decentralized agents, wherein the task distribution module optimizes real-time auditing efficiency by assigning specific data validation tasks to multiple agents, allowing the system to scale effectively even when processing large volumes of data, and enabling decentralized auditing for quicker detection and resolution of data integrity issues;

a self-healing module configured to automatically correct anomalies and inconsistencies identified in the flagged data, wherein the self-healing module performs real-time corrective actions, including recalculating erroneous data, restoring a data pipeline to a previously validated state, or discarding corrupted data to prevent further contamination of the AI system, ensuring continuous data integrity and preventing long-term degradation of the AI model's performance; and wherein the system operates dynamically and continuously in real time to ensure persistent monitoring, auditing, and correction of data anomalies throughout an entire data lifecycle, thereby preserving data integrity, enhancing data quality, and improving the performance and reliability of Explainable AI systems by preventing propagation of low-quality or corrupted data into critical decision-making processes.

2. The system of claim 1, wherein the anomaly detection module further comprises a machine learning-based algorithm configured to continuously improve its detection of data anomalies by learning from historical data and feedback received from previous anomaly detections, thereby increasing its precision in identifying corrupted or poisoned data over time.

3. The system of claim 2, wherein the anomaly detection module is further configured to classify the flagged data into different categories of anomalies, including data poisoning, irrelevant data, low-quality data, and inconsistent data, each of which triggers a different level of response based on severity and impact of the anomaly on the AI model.

4. The system of claim 3, wherein the anomaly detection module incorporates a threshold-based detection system, wherein the thresholds for flagging data anomalies are dynamically adjusted based on the volume and quality of incoming data, allowing the system to adapt to varying data conditions in real time.

5. The system of claim 4, wherein the automated data cleaning module further comprises a redundancy elimination sub-module configured to identify and remove duplicate data entries from the flagged data, thus reducing overall volume of data to be processed and enhancing the efficiency of AI model computations.

6. The system of claim 5, wherein the automated data cleaning module further performs noise reduction by applying statistical filtering techniques to remove random variations and inconsistencies from the flagged data, thereby improving signal-to-noise ratio in a dataset and enhancing the quality of inputs to the AI model.

7. The system of claim 6, wherein the automated data cleaning module further comprises a relevance assessment function, configured to assess significance of each flagged data point based on predefined criteria, and discarding data that is deemed irrelevant or non-contributory to the AI model's decision-making process.

8. The system of claim 7, wherein the dynamic encryption module is further configured to apply multi-layer encryption protocols that combine both symmetric and asymmetric encryption techniques, thereby enhancing the security of sensitive data and ensuring that only authorized entities have access to critical information during the federated learning process.

9. The system of claim 8, wherein the dynamic encryption module further includes an encryption key management sub-module, configured to automatically rotate and manage encryption keys based on the sensitivity of the data being processed, ensuring that data remains secure even as encryption keys are updated periodically.

10. The system of claim 9, wherein the traceability matrix module further provides a visualization interface that allows system administrators to track and review the processing history of any data point, including its source, transformation steps, and any anomalies flagged during an auditing process.

11. The system of claim 10, wherein the traceability matrix module further integrates with external auditing and compliance systems, allowing the system to generate reports on data integrity and compliance with data governance regulations for regulatory or organizational audits.

12. The system of claim 11, wherein the task distribution module further optimizes the assignment of auditing tasks based on the processing load of each agent, dynamically reallocating tasks in real time to ensure balanced workload distribution and preventing bottlenecks in the data auditing process.

13. The system of claim 12, wherein the task distribution module further monitors the performance of each agent within the swarm intelligence system, identifying underperforming or compromised agents and reassigning their tasks to other agents to ensure uninterrupted auditing of data integrity.

14. The system of claim 13, wherein the self-healing module further comprises a rollback function configured to restore the AI model's data pipeline to a previously validated state in event that the system detects irreparable anomalies, thereby preventing further contamination of the AI model by corrupted data.

15. The system of claim 14, wherein the self-healing module further incorporates a predictive analytics sub-module configured to anticipate potential anomalies or data corruption by analyzing historical anomaly patterns and applying predictive models to preemptively address issues before they affect the AI model's performance.

16. The system of claim 15, wherein the self-healing module further includes a notification system configured to alert system administrators when an anomaly is detected and corrected, providing detailed logs of the corrective actions taken and the impact on the data pipeline.

17. The system of claim 16, wherein the system is further configured to integrate with external data quality management tools, enabling seamless coordination between the system's data integrity processes and external platforms that monitor, validate, or govern data quality in AI or machine learning environments.

18. A system for enhancing data integrity and quality assurance in Explainable AI (XAI) systems, comprising:

a data collection module configured to receive data from a plurality of distributed sources during federated training processes, the data collection module further configured to continuously monitor and aggregate incoming data in real time, wherein the data collection module ensures secure transmission of data by employing secure communication protocols, prevents data loss or tampering during transit, and verifies authenticity of data sources to ensure only authorized nodes contribute data to the system;

an anomaly detection module configured to detect and flag corrupted, poisoned, irrelevant, or low-quality data using dynamic anomaly detection algorithms, wherein the anomaly detection module is further configured to:

(i) continuously improve its anomaly detection capabilities by learning from historical data patterns and feedback received from past anomaly detection instances, allowing the module to refine its ability to detect corrupted or poisoned data, (ii) classify flagged data into multiple categories of anomalies, including but not limited to data poisoning, irrelevant data, low-quality data, inconsistent data, and incomplete data, where each category triggers a specific level of response depending on severity of the anomaly and its potential impact on the AI model, (iii) dynamically adjust anomaly detection thresholds in real time based on volume, type, and quality of incoming data, ensuring that the system adapts to different data conditions without compromising on accuracy of anomaly detection, and (iv) automatically initiate customized remediation actions for different types of anomalies, including isolating corrupted data for further review, discarding irrelevant data, and correcting minor inconsistencies before further processing;

an automated data cleaning module configured to remove redundant, irrelevant, and unnecessary data from the flagged data, wherein the automated data cleaning module further:

(i) performs redundancy elimination by identifying duplicate data entries and removing them to reduce data clutter and prevent repetition, (ii) applies statistical filtering techniques such as outlier detection and noise reduction to remove random variations, errors, and inconsistencies from the flagged data, thus improving signal-to-noise ratio and ensuring the AI model is trained on clean, high-quality data, (iii) assesses relevance of each flagged data point by evaluating its contribution to the AI model's decision-making process based on predefined relevance criteria, where data deemed irrelevant is automatically discarded to streamline data processing, and (iv) continuously improves the quality and performance of AI model inputs by eliminating redundant, noisy, and irrelevant data that could negatively impact the accuracy and efficiency of the AI system;

a dynamic encryption module configured to apply adaptive encryption protocols to sensitive data in real time, wherein the dynamic encryption module further:

(i) applies multi-layer encryption combining symmetric and asymmetric encryption techniques, thereby providing a higher level of data protection, especially for sensitive information that could be compromised by unauthorized access or cyberattacks, (ii) includes an automatic encryption key management sub-module that rotates encryption keys periodically, or based on the sensitivity of the data, thereby minimizing risk of encryption key compromise and ensuring ongoing protection of data as it is processed by the system, (iii) allows for encryption policies that dynamically adjust based on the sensitivity and classification of the data being processed, ensuring that the highest levels of encryption are applied to the most critical and sensitive data streams, and (iv) supports secure key exchange protocols that facilitate the secure sharing of encryption keys between authorized entities involved in the federated learning process;

a traceability matrix module configured to track origin, lineage, and processing history of each data point received by the system, wherein the traceability matrix module further:

(i) maintains a comprehensive log of each data point's origin, transformations, and processing steps, enabling system administrators to review and audit a full lifecycle of any data point, (ii) provides a visualization interface that enables system administrators to view, in real time, complete processing history of data points, from their original source through to their final inclusion in AI model computations, (iii) integrates with external auditing systems, data governance platforms, and regulatory compliance systems to facilitate generation of audit reports, compliance certifications, and proof of data integrity, and (iv) ensures that the traceability matrix can quickly identify and isolate any compromised or anomalous data points, allowing for timely resolution of data issues and restoration of integrity in the AI processing pipeline;

a task distribution module configured to implement swarm intelligence for decentralized auditing of data integrity across distributed components of the system, wherein the task distribution module further:

(i) optimizes assignment of auditing tasks by distributing them across multiple agents in a decentralized network, where each agent is assigned specific responsibilities for real-time data validation and integrity checks, (ii) dynamically reallocates tasks based on the processing load of each agent, ensuring efficient use of system resources and preventing any bottlenecks that could slow down the auditing process, (iii) monitors the performance and reliability of each agent, identifying underperforming or compromised agents, and reassigning their tasks to other agents to ensure that data auditing continues uninterrupted and with high accuracy, and (iv) provides an adaptive framework for task reassignment, wherein agents can collaborate and exchange information about detected anomalies, further enhancing the system's ability to detect and respond to data integrity issues in real time;

a self-healing module configured to automatically correct anomalies and inconsistencies identified in the flagged data, wherein the self-healing module further:

(i) performs real-time corrective actions such as recalculating erroneous data points, restoring a data pipeline to a previously validated state when anomalies cannot be corrected in real time, or discarding compromised data to prevent its inclusion in AI model computations, (ii) includes a rollback function that allows the system to revert the AI model's data pipeline to an earlier, validated state in the event that irreparable anomalies are detected, preventing further contamination or degradation of the AI model's performance, (iii) incorporates a predictive analytics sub-module that analyzes historical anomaly detection patterns and applies machine learning models to anticipate potential anomalies or data corruption before they occur, allowing for proactive prevention of data issues, and (iv) includes a notification and logging system that automatically alerts system administrators when anomalies are detected and corrected, providing detailed reports of the corrective actions taken, root cause of the anomaly, and the impact on overall AI model performance; and wherein the system operates dynamically and continuously in real time to ensure persistent monitoring, auditing, and correction of data anomalies, thereby preserving data integrity and quality, enhancing data security, and improving AI model performance, the system being capable of adapting to varying data conditions, scaling to accommodate large data volumes, and integrating with external platforms to ensure comprehensive data governance and compliance in complex AI-driven environments.

19. A method for enhancing data integrity and quality assurance in Explainable AI (XAI) systems, comprising:

receiving, by a data collection module, data from a plurality of distributed sources during federated training processes, wherein the data collection module continuously monitors and aggregates the incoming data in real time, ensuring secure transmission by employing secure communication protocols and verifying the authenticity of data sources;

detecting, by an anomaly detection module, corrupted, poisoned, irrelevant, or low-quality data using dynamic anomaly detection algorithms, wherein the anomaly detection module:

(i) continuously improves anomaly detection by learning from historical data patterns and feedback, (ii) classifies flagged data into categories of anomalies including data poisoning, irrelevant data, low-quality data, and inconsistent data, (iii) dynamically adjusts detection thresholds based on the volume and quality of the incoming data, and (iv) triggers different levels of response based on the severity and potential impact of the anomaly on the AI model;

cleaning, by an automated data cleaning module, the flagged data by removing redundant, irrelevant, or unnecessary data, wherein the automated data cleaning module:

(i) identifies and eliminates duplicate data entries to reduce redundancy, (ii) applies statistical filtering techniques to remove noise and improve the signal-to-noise ratio, (iii) assesses the relevance of each data point based on predefined criteria and discards data deemed non-contributory to the AI model's decision-making process, and (iv) continuously improves data quality by eliminating noise and irrelevant data, enhancing overall performance of AI model inputs;

applying, by a dynamic encryption module, adaptive encryption protocols to sensitive data in real time, wherein the dynamic encryption module:

(i) uses multi-layer encryption combining symmetric and asymmetric encryption techniques for enhanced security, (ii) manages encryption keys automatically, rotating them periodically or based on the sensitivity of the data, and (iii) dynamically adjusts encryption policies based on the sensitivity of the data being processed, ensuring that sensitive data is securely protected throughout its lifecycle;

tracking, by a traceability matrix module, the origin, lineage, and processing history of each data point, wherein the traceability matrix module:

(i) maintains a comprehensive log of the origin and transformations of each data point, (ii) provides a visualization interface for system administrators to view the processing history of data points in real time, (iii) integrates with external auditing systems to generate audit reports and compliance documentation, and (iv) enables the system to quickly identify and isolate any compromised or anomalous data points for resolution;

distributing, by a task distribution module, auditing tasks using swarm intelligence for decentralized validation of data integrity, wherein the task distribution module:

(i) optimizes task assignment across multiple agents to balance processing loads and improve real-time auditing efficiency, (ii) dynamically reallocates tasks to prevent bottlenecks and ensure continuous auditing, (iii) monitors agent performance, reassigning tasks from underperforming or compromised agents to maintain uninterrupted auditing, and (iv) facilitates collaboration between agents to enhance the detection and response to data integrity issues in real time;

correcting, by a self-healing module, anomalies identified in the flagged data, wherein the self-healing module:

(i) performs real-time corrective actions such as recalculating data, restoring data to a previously validated state, or discarding compromised data, (ii) implements a rollback function to revert the AI model's data pipeline to a validated state if irreparable anomalies are detected, (iii) incorporates predictive analytics to anticipate potential anomalies or data corruption, and (iv) generates notifications and logs for system administrators, detailing the detected anomalies and the corrective actions taken; and wherein the method operates dynamically and continuously in real time to ensure persistent monitoring, auditing, and correction of data anomalies, thereby preserving data integrity, enhancing data quality, improving AI model performance, and safeguarding the system against data corruption, unauthorized access, and computational inefficiencies.

20. The method of claim 19, wherein the anomaly detection module further comprises a machine learning sub-system configured to enhance its anomaly detection capabilities, wherein the machine learning sub-system:

(i) applies supervised learning techniques using labeled datasets of historical data anomalies to train the anomaly detection model, continuously improving its ability to identify patterns indicative of corrupted or poisoned data, (ii) utilizes reinforcement learning by incorporating feedback loops from the system's self-healing module, enabling the anomaly detection module to adjust its detection thresholds dynamically based on effectiveness of previous corrective actions, (iii) applies unsupervised learning methods, including clustering algorithms, to identify novel or previously unseen data anomalies by analyzing deviations from normal data behavior across various distributed sources, and (iv) performs real-time recalibration of its detection models to account for shifting data patterns or emerging data types in federated learning environments, ensuring that the detection system evolves and remains resilient against increasingly sophisticated data poisoning attacks and cyber threats.

* * * * *